United States Patent
Won

(10) Patent No.: US 9,256,291 B2
(45) Date of Patent: Feb. 9, 2016

(54) MOBILE DEVICE AND METHOD FOR DISPLAYING INFORMATION

(71) Applicant: Samsung Electronics Co., Ltd., Suwon-si, Gyeonggi-do (KR)

(72) Inventor: Sung-Joon Won, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 14/156,812

(22) Filed: Jan. 16, 2014

(65) Prior Publication Data

US 2014/0198070 A1    Jul. 17, 2014

(30) Foreign Application Priority Data

Jan. 16, 2013  (KR) ........................ 10-2013-0005129

(51) Int. Cl.

| | |
|---|---|
| *G06F 3/01* | (2006.01) |
| *G06F 1/16* | (2006.01) |
| *H04M 1/04* | (2006.01) |
| *H04M 1/67* | (2006.01) |
| *H04M 1/725* | (2006.01) |
| *G06F 3/041* | (2006.01) |
| *H04M 1/02* | (2006.01) |

(52) U.S. Cl.
CPC .............. *G06F 3/017* (2013.01); *G06F 1/1628* (2013.01); *G06F 3/041* (2013.01); *H04M 1/0272* (2013.01); *H04M 1/04* (2013.01); *H04M 1/67* (2013.01); *H04M 1/72575* (2013.01); *G06F 2200/1634* (2013.01); *G06F 2203/04803* (2013.01); *H04M 1/0245* (2013.01); *H04M 2250/12* (2013.01)

(58) Field of Classification Search
CPC ........ G06F 3/017; G06F 3/04; H04M 1/0272; H04M 1/02; H04M 1/00
See application file for complete search history.

(56) References Cited

U.S. PATENT DOCUMENTS

| | | | |
|---|---|---|---|
| 5,414,444 A | 5/1995 | Britz | |
| 5,555,157 A | 9/1996 | Moller et al. | |
| 7,463,247 B2 | 12/2008 | Berry | |
| 2001/0012769 A1 | 8/2001 | Sirola et al. | |
| 2003/0038786 A1 | 2/2003 | Nguyen et al. | |
| 2005/0054391 A1 | 3/2005 | Chen | |
| 2012/0194308 A1 | 8/2012 | Lauder et al. | |
| 2012/0194448 A1 | 8/2012 | Rothkopf | |
| 2013/0285925 A1* | 10/2013 | Stokes et al. .................. | 345/173 |
| 2013/0328825 A1* | 12/2013 | Brown et al. .................. | 345/174 |

FOREIGN PATENT DOCUMENTS

| | | |
|---|---|---|
| EP | 2296355 A2 | 3/2011 |
| KR | 2011-0025939 A | 3/2011 |
| KR | 10-1187187 B1 | 10/2012 |

* cited by examiner

*Primary Examiner* — Tony N Ngo
(74) *Attorney, Agent, or Firm* — Jefferson IP Law, LLP

(57) ABSTRACT

A mobile device control method for displaying information on a touch screen of a mobile device is provided. The method includes determining a type of a cover for the mobile device, the cover having a screen projection portion, detecting a gesture or a trigger, and displaying a screen corresponding to a current state of the mobile device on the touch screen depending on the type of the cover, in response to the detection of the gesture or the trigger.

33 Claims, 17 Drawing Sheets

MOBILE DEVICE AND METHOD FOR DISPLAYING INFORMATION

CROSS-REFERENCE TO RELATED APPLICATION(S)

This application claims the benefit under 35 U.S.C. §119 (a) of a Korean patent application filed on Jan. 16, 2013 in the Korean Intellectual Property Office and assigned Serial No. 10-2013-0005129, the entire disclosure of which is hereby incorporated by reference.

TECHNICAL FIELD

The present disclosure relates to a mobile device. More particularly, the present disclosure relates to a mobile device and method for displaying information.

BACKGROUND

Recently, a variety of electronic devices have been provided to users. In addition, mobile devices are generally portable and may be carried by a user. The users may use the mobile devices to access a variety of content. Accordingly, the mobile devices have been widely used as mobile terminals, MP3 players, Portable Multimedia Players (PMPs), E-book readers, and the like. The mobile devices may be equipped not only with the wireless transmission/reception function, but also with a variety of other functions for photos, music, videos, multimedia, games, and the like. On the front of the mobile devices may be mounted a touch screen to allow users to enjoy the multimedia functions. A recent trend is that mobile devices such as smart phones are equipped with a touch screen, the entire front of which is sensitive to a touch.

However, in the case of a mobile device, an exterior case of the mobile device or a touch screen thereof which is exposed at the front of the mobile device, may be scratched or damaged due to shocks, while a user carries the mobile device, or while the user uses (e.g., views or manipulates) the mobile device. In order to prevent the scratches or damages, a variety of cases or covers (hereinafter referred to as a 'cover device' in common) have been provided for the mobile device. As for the existing cover device for covering the mobile device, the user may use a cover device that is configured to expose a display side to allow the user to use a touch screen, and to cover only the exterior border or rear case of the mobile device, or a cover device that is configured to fully cover the mobile device with a flip-type case, and to enable a portion for covering the touch screen to be opened and closed, allowing the user to use the touch screen. When using the cover device so as to expose the touch screen, preventing the touch screen from being scratched or damaged is difficult. When using the flip-type cover device covering the touch screen, the user is required to open the cover that covers the touch screen each time the user uses the touch screen, thereby inconveniencing the user. For example, the user is required to open the cover even for a simple check of a status on the mobile device. Further, in the case of the flip cover, the user is required to open the cover to use the touch screen every time the user manipulates the mobile device, thereby causing the flip cover to become worn out. In both of the former cover device (e.g., the cover device covering only the exterior) and the latter cover device (e.g., the flip-type cover device), the mobile device is vulnerable to scratches or damages because the touch screen needs to be exposed to the exterior and undergoes a contact for a touch when the user uses the touch screen.

Therefore, there is a need for a mobile device with a cover that prevents scratches or damages of the mobile device by covering a touch screen while a user uses the touch screen, and a method for controlling the same.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mobile device and method for displaying information.

Another aspect of the present disclosure is to provide a mobile device and method for displaying a screen corresponding to the current state of the mobile device on a touch screen depending on a type of a cover with a screen projection portion.

Another aspect of the present disclosure is to provide a mobile device and method for displaying a screen on a touch screen to expose the screen depending on a position of a screen projection portion of a cover, in displaying a screen depending on a type of the cover with a screen projection portion.

Another aspect of the present disclosure is to provide a mobile device and a control method for displaying a screen on a touch screen by executing an action corresponding to a current state of the mobile device upon detecting an open state of a cover, in displaying a screen depending on a type of the cover with a screen projection portion.

Another aspect of the present disclosure is to provide a mobile device and a control method for providing an auto-switch function for a one-hand operation, in displaying a screen depending on a type of a cover with a screen projection portion.

In accordance with an aspect of the present disclosure, a method for displaying information on a touch screen of a mobile device is provided. The method includes determining a type of a cover for the mobile device, the cover having a screen projection portion, detecting a gesture or a trigger, and displaying a screen corresponding to a current state of the mobile device on the touch screen depending on the type of the cover, in response to the detection of the gesture or the trigger. It will be appreciated that the term "screen projection portion" means a portion of the cover through which at least a portion of a display screen (e.g. the touch screen) is visible to a user while the cover is fitted, attached, or otherwise engaged with the device. Thus, in certain embodiments, at least a portion of the display screen is visible to a user through the screen projection portion while the cover is in a closed state, and/or without having to open or remove the cover. In certain embodiments the screen projection portion may alternatively be described as a screen viewing portion, and may comprise a window, aperture, opening, or cut-out in the cover. In certain embodiments the screen viewing portion comprises a transparent member (e.g. a thin sheet of transparent material) through which at least part of the screen can be viewed, and which also provides physical protection to that portion of the screen. The gesture may also be described as an input (e.g. a user input), and the trigger may also be described as an event.

In accordance with another aspect of the present disclosure, a mobile device is provided. The mobile device includes a touch screen configured to display information of the mobile device, and a controller configured to determine a type of a cover of the mobile device, the cover having a screen projection portion, configured to detect a gesture or a trigger, and configured to display a screen corresponding to a current state of the mobile device on the touch screen depending on the type of the cover, in response to the detection of the gesture or the trigger.

In accordance with further another aspect of the present disclosure, a method for displaying information is provided. The method includes detecting a signal corresponding to a separation between a mobile device and an attached portion of a cover for the mobile device, and displaying a screen corresponding to a state of the mobile device in response to the detected signal.

Another aspect of the invention provides a method of operating a mobile device having a touch screen and having a cover attached, the method comprising: determining a type of the attached cover; and displaying information on the touch screen, wherein at least one of a content and a format of the displayed information is determined according to the type of the attached screen.

Another aspect of the invention provides a method of operating a mobile device having a touch screen and having a cover attached, the method comprising: determining at least one of a position and size of a screen viewing portion of the attached screen; and displaying information on a portion of the touch screen visible through the screen viewing portion, wherein at least one of a content and a format of the displayed information is determined according to at least one of the determined position and/or size of the screen viewing portion.

In certain embodiments, the method (in accordance with any of the above-mentioned aspects) further comprises detecting a state (e.g. open, closed, folded in a first position, folded in a second position etc.) of the cover, and determining (setting, arranging) at least one of a content and a format of the displayed information according to the detected state.

Another aspect provides a mobile device having a touch screen and having a cover attached, the mobile device being adapted to determine a type of the attached cover; and display information on the touch screen, wherein at least one of a content and a format of the displayed information is determined according to the type of the attached screen.

Another aspect provides a mobile device having a touch screen and having a cover attached, the mobile device being adapted to determine at least one of a position and size of a screen viewing portion of the attached screen; and display information on a portion of the touch screen visible through the screen viewing portion, wherein at least one of a content and a format of the displayed information is determined according to at least one of the determined position and/or size of the screen viewing portion.

Thus, in certain embodiments, the attached screen may be one of a plurality of different types that may be attached to the mobile device, each having a respective screen viewing portion of a respective size and respective position. A device embodying the invention, and implementing one of the above-mentioned aspects, may thus determine what information is to be displayed, and where that information should be displayed on the screen (and also other details of format, e.g. font size, colour, etc.) so as to coincide with the screen viewing portion of the particular attached cover. In other words, the device may be adapted to detect the type of attached cover and adapt the display of information on the screen to take into account the position and/or size of the screen viewing portion. The device can thus select the content and format of the information to be displayed to a user through the particular screen viewing portion. It will be appreciated that certain embodiments of the invention include means for detecting and/or determining a type of an attached cover, and/or means for detecting and/or determining at least one of a size and a position of a screen viewing portion of an attached cover. Certain embodiments further comprise means for detecting a state (e.g. open, closed, folded in a first position, folded in a second position etc.) of the cover, and in certain such embodiments the device may be further adapted to determine (set, arrange) at least one of a content and a format of the displayed information according to the detected state.

Another aspect of the invention provides a computer program comprising instructions arranged, when executed, to implement a method and/or apparatus (e.g. device) in accordance with any one of the above-described aspects. A further aspect provides machine-readable storage storing such a program.

It will be appreciated from the following description that, in certain embodiments of the invention, features concerning the graphic design of user interfaces are combined with interaction steps or means to achieve a technical effect.

It will be appreciated from the following description that, in certain embodiments of the invention, graphic features concerning technical information (e.g. internal machine states) are utilized to achieve a technical effect.

Certain embodiments aim to achieve the technical effect of lowering a burden (e.g. a cognitive, operative, operational, operating, or manipulative burden) of a user when performing certain computer or device interactions.

Certain embodiments aim to achieve the technical effect of providing a more efficient man-machine (user-machine) interface.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As a non-exhaustive illustration only, a device described herein may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and devices such as a desktop PC, a high definition television (HDTV), an optical disc player, a set-top box, and the like capable of wireless communication or network communication consistent with that disclosed herein.

Figure 1:
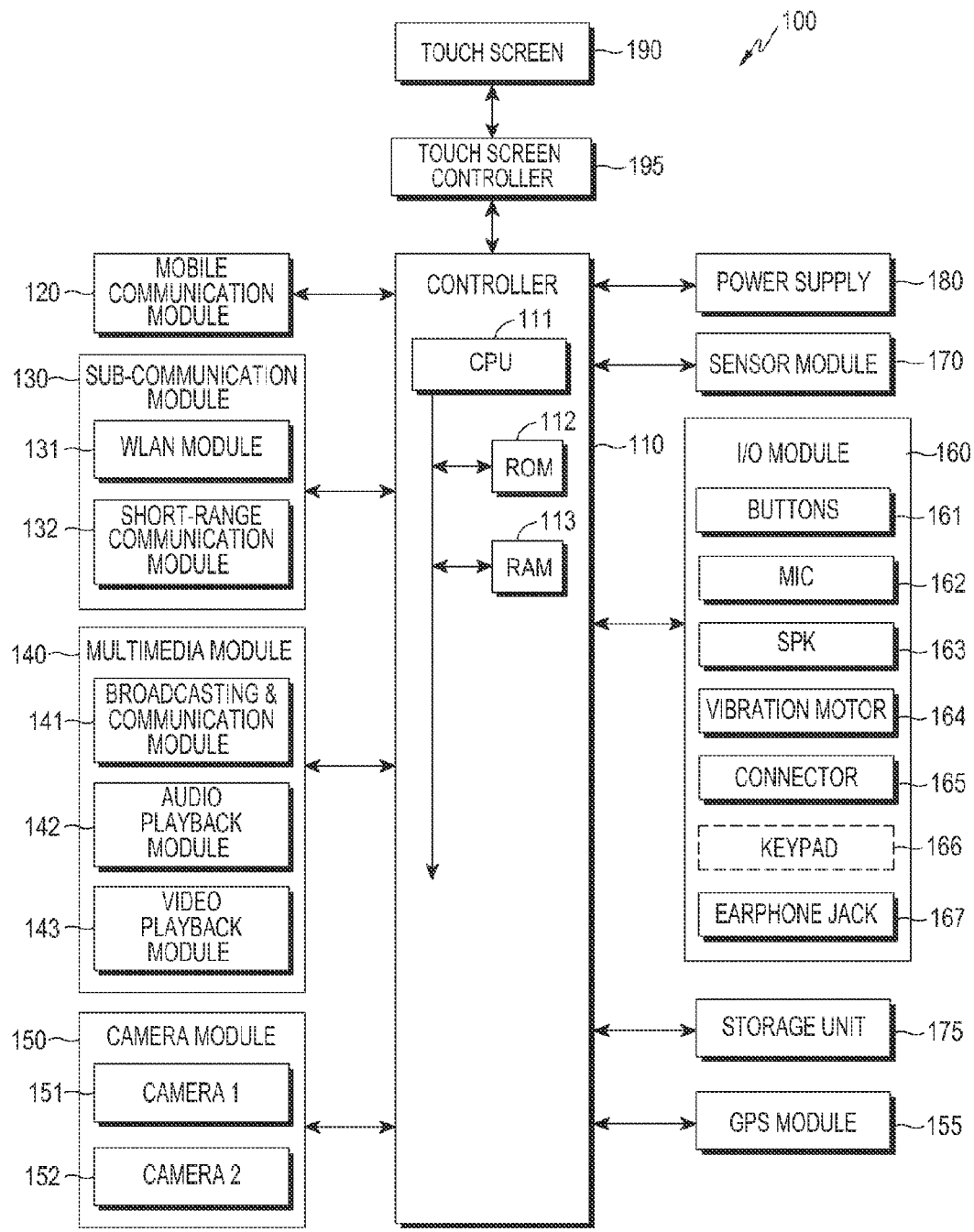
FIG. 1 is a schematic block diagram illustrating a mobile device according to an embodiment of the present disclosure.

FIG. 1 is a schematic block diagram illustrating a mobile device according to an embodiment of the present disclosure.

Referring to FIG. 1, a mobile device 100 may include a controller 110, a mobile communication module 120, a sub-communication module 130, a multimedia module 140, a camera module 150, a Global Positioning System (GPS) module, an Input/Output (I/O) module 160, a sensor module 170, a storage unit 175, a power supply 180, a touch screen 190, and a touch screen controller 195.

The mobile device 100 may be connected to external devices (not shown) using external device connection units such as the sub-communication module 130, a connector 165 and an earphone jack 167. The external devices may include a variety of devices such as earphones, external speakers, Universal Serial Bus (USB) memories, chargers, cradles, docking stations, Digital Multimedia Broadcasting (DMB) antennas, mobile payment-related devices, healthcare devices (e.g., a blood glucose meter, and the like), game consoles, car navigation devices, and the like, all of which can be detachably connected to the mobile device 100 by wires. In addition, the external devices may include short-range communication devices such as Bluetooth devices, Near Field Communication (NFC) devices, WiFi Direct devices, wireless Access Points (APs), and/or the like, all of which can be wirelessly connected to the mobile device 100 by short-range communication. The external devices may also include other devices, cellular phones, smart phones, tablet Personal Computers (PCs), desktop PCs, servers, and the like.

The controller 110 may include a Central Processing Unit (CPU) 111, a Read Only Memory (ROM) 112 storing a control program for control of the mobile device 100, and a Random Access Memory (RAM) 113 that temporarily stores signals or data received from the outside of the mobile device 100, or that is used as a workspace for operations performed in the mobile device 100. The CPU 111 may have a various number of cores. For example, the CPU 111 may include a single-core CPU, a dual-core CPU, a triple-core CPU, a quad-core CPU, and the like. The CPU 111, the ROM 112 and the RAM 113 may be interconnected via an internal bus.

The controller 110 may control the mobile communication module 120, the sub-communication module 130, the multimedia module 140, the camera module 150, the GPS module 155, the I/O module 160, the sensor module 170, the storage unit 175, the power supply 180, the touch screen 190 and the touch screen controller 195.

The mobile communication module 120, under control of the controller 110, may connect the mobile device 100 to the external devices by mobile communication using one or multiple antennas (not shown). The mobile communication module 120 may transmit and receive wireless signals for voice calls, video calls, Short Message Service (SMS) messages or Multimedia Messaging Service (MMS) messages, to/from cellular phones (not shown), smart phones (not shown), tablet PCs (not shown) or other devices (not shown), phone numbers of all of which are registered in the mobile device 100.

The sub-communication module 130 may include at least one of the WLAN module 131 and the short-range communication module 132. For example, the sub-communication module 130 may include any one or both of the WLAN module 131 and the short-range communication module 132.

The WLAN module 131, under control of the controller 110, may access the Internet in the place in which a wireless AP (not shown) is installed. According to various embodiments of the present disclosure, the WLAN module 131 may support the WLAN standard IEEE802.11x defined by Institute of Electrical and Electronics Engineer (IEEE), and/or the like. The short-range communication module 132, under control of the controller 110, may enable wireless short-range communication between the mobile device 100 and an image forming apparatus (not shown). The short-range communication scheme may include Bluetooth, Infrared Data Association (IrDA), WiFi-Direct, NFC, and the like.

According to various embodiments of the present disclosure, the mobile device 100 may include at least one of the mobile communication module 120, the WLAN module 131 and the short-range communication module 132. For example, the mobile device 100 may include a combination of the mobile communication module 120, the WLAN module 131 and the short-range communication module 132, depending on performance and/or configuration of the mobile device 100.

The multimedia module 140 may include at least one of the broadcasting & communication module 141, the audio playback module 142, and the video playback module 143. The broadcasting & communication module 141, under control of the controller 110, may receive broadcast signals (e.g., TV broadcast signals, radio broadcast signals, data broadcast signals, and/or the like) and additional broadcast information (e.g., Electric Program Guide (EPG), Electric Service Guide (ESG), and/or the like) sent from broadcasting stations via a broadcasting & communication antenna (not shown). The audio playback module 142, under control of the controller 110, may play stored or received digital audio files (with a file extension of, for example, mp3, wma, ogg or way). The video playback module 143, under control of the controller 110, may play stored or received digital video files (with a file extension of, for example, mpeg, mpg, mp4, avi, mov, or mkv). The video playback module 143 may play the digital audio files.

The multimedia module 140 may include the audio playback module 142 and the video playback module 143, excluding the broadcasting & communication module 141. The audio playback module 142 and the video playback module 143 in the multimedia module 140 may be incorporated into the controller 110.

The camera module 150 may include at least one of a first camera 151 and a second camera 152, which can capture still images or videos under control of the controller 110. The first camera 151 and/or the second camera 152 may include an auxiliary light source (e.g., a flash (not shown)) for providing light needed for image capture. The first camera 151 may be disposed on the front of the mobile device 100, and the second camera 152 may be disposed on the rear of the mobile device 100. In an alternative way, the first camera 151 and the second camera 152 may be disposed on the front of the mobile device 100 to be adjacent to each other (e.g., with a gap between them being set greater than 1 cm and less than 8 cm), to capture 3-Dimentional (3D) still images or 3D videos.

The GPS module 155 may receive radio waves from a plurality of GPS satellites (not shown) in the Earth orbit, and calculate the location of the mobile device 100 using the Time of Arrival (ToA) of the radio waves from the GPS satellites to the mobile device 100.

The I/O module 160 may include at least one of the multiple buttons 161, a microphone 162, a speaker 163, a vibration motor 164, a connector 165, a keypad 166, and/or the like.

The buttons 161 may be mounted on the front, side or rear of the housing of the mobile device 100, and may include at least one of a Power/Lock button, a Volume button, a Menu button, a Home button, a Back button, and a Search button.

The microphone 162, under control of the controller 110, may generate electrical audio signals by receiving or picking up voice or sound.

The speaker 163, under control of the controller 110, may output the sounds corresponding to various signals (e.g., wireless signals, broadcast signals, digital audio files, digital video files, shooting tones, or the like) from the mobile communication module 120, the sub-communication module 130, the multimedia module 140 or the camera module 150, to the outside of the mobile device 100. The speaker 163 may output the sound (e.g., button manipulation tones or ring back tones for calls) corresponding to the function executed by the mobile device 100. One or multiple speakers 163 may be mounted in a proper position or positions of the housing of the mobile device 100.

The vibration motor 164, under control of the controller 110, may convert an electrical signal into mechanical vibrations. For example, upon receiving a voice call from another device (not shown), the mobile device 100 in vibration mode may enable the vibration motor 164. One or multiple vibration motors 164 may be mounted in the housing of the mobile device 100. The vibration motor 164 may be enabled in response to a user's touch operation on the touch screen 190 and a continuous movement of a touch on the touch screen 190.

The connector 165 may be used as an interface for connecting the mobile device 100 to the external devices (not shown) or a power source (not shown). The mobile device 100, under control of the controller 110, may transmit data stored in the storage unit 175 of the mobile device 100 to the external devices (not shown) or receive data from the external devices (not shown), via a wired cable connected to the connector 165. The external device may be a docking station, and the data may be an input signal provided from an external input device (e.g., a mouse, a keyboard and the like). The mobile device 100 may receive power from the power source (not shown) or charge a rechargeable battery thereof (not shown) using the power source, via a wired cable connected to the connector 165.

The keypad 166 may receive key inputs from the user for control of the mobile device 100. The keypad 166 may include a physical keypad (not shown) mounted in the mobile device 100 or a virtual keypad (not shown) displayed on the touch screen 190. The physical keypad mounted in the mobile device 100 may be optional depending on the performance or structure of the mobile device 100.

An earphone (not shown) may be inserted in the earphone jack 167, and connected to the mobile device 100.

The sensor module 170 may include at least one sensor for detecting a state of the mobile device 100. For example, the sensor module 170 may include a proximity sensor for detecting the user's proximity to the mobile device 100, and an illuminance sensor for detecting the amount of light around the mobile device 100. The sensor module 170 may also include a gyro sensor, which may detect movement (e.g., rotation, acceleration, vibration, and/or the like) of the mobile device 100, detect the point of the compass using the Earth's magnetic field, and detect the direction of gravity. The sensor module 170 may also include an altimeter for detecting an altitude by measuring the atmosphere pressure. The at least one sensor may detect a state of the mobile device 100, generate a signal corresponding to the detection, and provide the signal to the controller 110. The at least one sensor may be added and removed to/from the sensor module 170 depending on the performance and/or configuration of the mobile device 100.

The storage unit 175, under control of the controller 110, may store signals or data which are input and output to corresponding to operations of the mobile communication module 120, the sub-communication module 130, the multimedia module 140, the camera module 150, the GPS module 155, the I/O module 160, the sensor module 170, and the touch screen 190. The storage unit 175 may store a control program for control of the mobile device 100 or the controller 110, and a variety of applications.

The term 'storage unit' may be construed to include the storage unit 175, the ROM 112 and the RAM 113 in the controller 110, a memory card (not shown) (e.g., a Secure Digital (SD) card and a memory stick) mounted in the mobile device 100, and/or the like. The storage unit may include a non-volatile memory, a volatile memory, a Hard Disk Drive (HDD), a Solid State Drive (SSD), and/or the like.

The power supply 180, under control of the controller 110, may supply power to one or multiple rechargeable batteries (not shown) mounted in the housing of the mobile device 100. The one or multiple rechargeable batteries (not shown) may supply power to the mobile device 100. The power supply 180 may supply, to the mobile device 100, the power that is received from an external power source (not shown) via a wired cable connected to the connector 165. The power supply 180 may supply, to the mobile device 100, the power that is wirelessly received from the external power source by wireless charging technology.

The touch screen 190 may provide, to the user, user interfaces corresponding to a wide range of services (e.g., calls, data transmission, broadcasting, shooting and the like). The touch screen 190 may transfer an analog signal corresponding to at least one touch made on a user interface, to the touch screen controller 195. The touch screen 190 may receive at least one touch made by the user's body (e.g., fingers including the thumb) or a touch input means (e.g., a stylus pen, and/or the like). The touch screen 190 may also receive a continuous movement of one touch among at least one touch. The touch screen 190 may transfer an analog signal corresponding to the received continuous movement of a touch to the touch screen controller 195.

According to various embodiments of the present disclosure, the term 'touch' may include not only contact touch (or direct touch) but also non-contact touch (or indirect touch) between the touch screen 190 and the user's body or the touch input means. A gap at which the touch screen 190 may detect the user's body or the touch input means is subject to change depending on the performance or structure of the mobile device 100.

The touch screen 190 may be implemented in, for example, a resistive type, a capacitive type, an infrared type, or an acoustic wave type.

The touch screen controller 195 may convert an analog signal received from the touch screen 190 into a digital signal (e.g., X and Y coordinates), and provide the digital signal to the controller 110. The controller 110 may control the touch screen 190 using the digital signal received from the touch screen controller 195. For example, the controller 110 may select or execute a shortcut icon (not shown) displayed on the touch screen 190 in response to a touch. The touch screen controller 195 may be incorporated into the controller 110.

Figure 2:
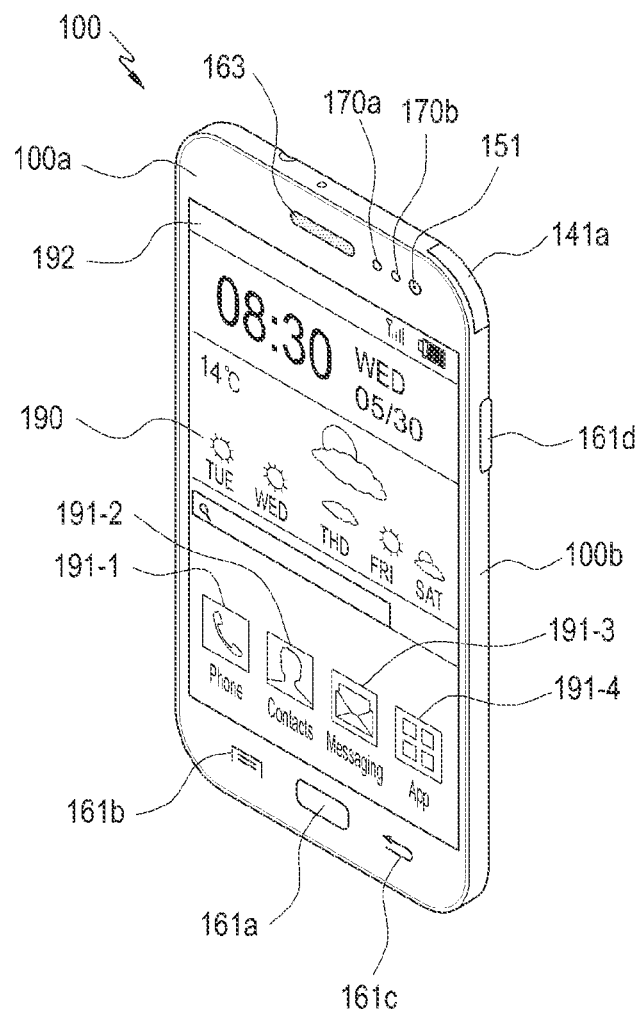
FIG. 2 is a front perspective view of a mobile device according to an embodiment of the present disclosure.
Figure 3:
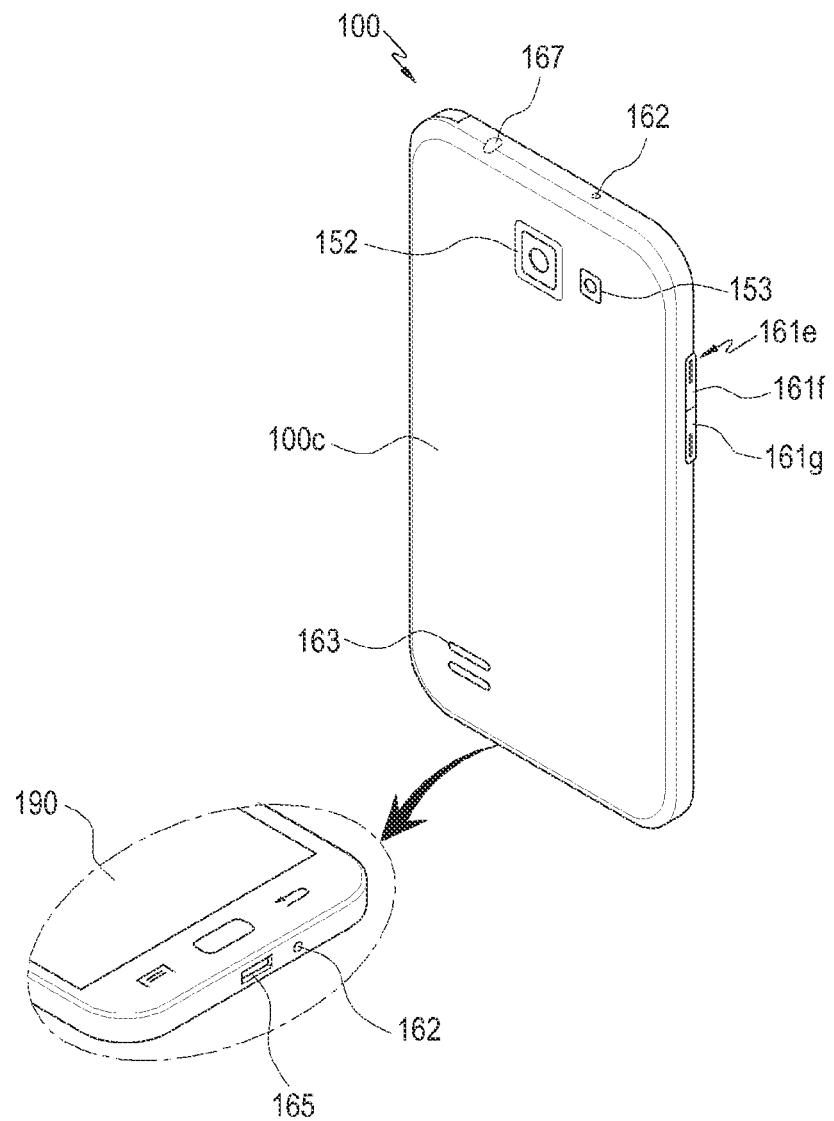
FIG. 3 is a rear perspective view of a mobile device according to an embodiment of the present disclosure.

FIG. 2 is a front perspective view of a mobile device according to an embodiment of the present disclosure, and FIG. 3 is a rear perspective view of a mobile device according to an embodiment of the present disclosure.

Referring to FIGS. 2 and 3, the touch screen 190 may be disposed in the center of a front 100*a* of the mobile device 100. The touch screen 190 may be formed large enough to occupy most of the front 100*a* of the mobile device 100. As illustrated in FIG. 2, a main home screen is displayed on the touch screen 190. The main home screen may be the first screen that is displayed on the touch screen 190 when the mobile device 100 is powered on. If the mobile device 100 has different home screens of several pages, the main home screen may be the first home screen among the home screens of several pages. On the main home screen may be displayed shortcut icons 191-1, 191-2 and 191-3 for executing frequently used applications, an application switch key 191-4, the time, the weather and the like. The application switch key 191-4 may be used to display, on a screen, application icons representing applications on the touch screen 190. On the top of the touch screen 190 may be displayed a status bar 192 indicating states of the mobile device 100, such as a battery charging status, a received signal strength, and the current time.

Under the touch screen 190 may be formed a Home button 161*a*, a Menu button 161*b*, and a Back button 161*c*.

The Home button 161*a* may be used to display the main home screen on the touch screen 190. For example, if the Home button 161*a* is pressed (or selected) while any home screen different from the main home screen, or a menu screen is displayed on the touch screen 190, the main home screen may be displayed on the touch screen 190. If the Home button 161*a* is pressed (or selected) while applications are executed on the touch screen 190, the main home screen shown in FIG. 2 may be displayed on the touch screen 190. The Home button 161*a* may also be used to display recently used applications or a task manager on the touch screen 190.

The Menu button 161*b* may be used to provide connection menus that can be used on the touch screen 190. The connection menus may include an Add Widget menu, a Change Wallpaper menu, a Search menu, an Edit menu, a Preferences menu, and the like. During execution of an application, the Menu button 161*b* may be used to provide a connection menu connected to the application.

The Back button 161*c* may be used to display a screen preceding the current screen, or to exit the most recently used application.

On an edge of the front 100*a* of the mobile device 100 may be mounted the first camera 151, an illuminance sensor 170*a* and a proximity sensor 170*b*. A speaker 163 may be disposed on the front 100*a* of the mobile device 100. On a rear 100*c* of the mobile device 100 may be disposed the second camera 152, a flash 153, and the speaker 163.

On sides 100*b* of the mobile device 100 may be disposed, for example, a Power/Rest button 161*d*, a Volume button 161*e* (including a Volume Up button 161*f* and a Volume Down button 161*g*), a terrestrial DMB antenna 141*a* for broadcast reception, one or multiple microphones 162, and/or the like. The DMB antenna 141*a* may be detachably mounted in the mobile device 100.

The connector 165 may be mounted in the bottom side of the mobile device 100. A plurality of electrodes may be formed in the connector 165, and connected to the external devices by wires. The earphone jack 167 may be mounted in the top side of the mobile device 100. An earphone (not shown) may be inserted in the earphone jack 167.

Figure 7A:
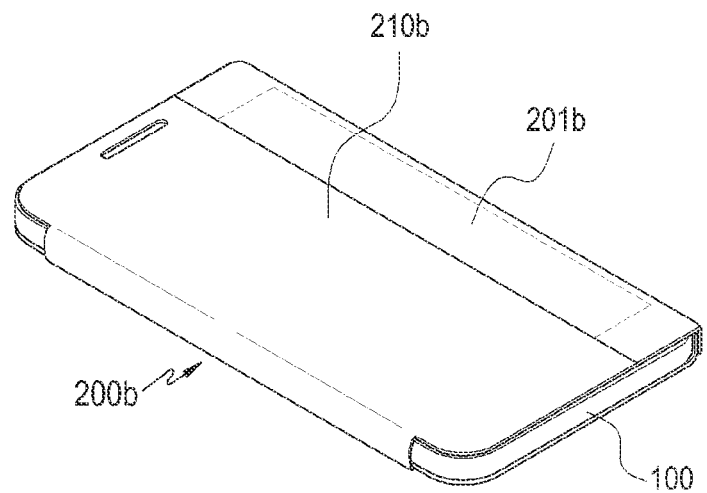
FIGS. 7A, 7B, and 8 schematically illustrate a mobile device and a cover with a screen projection portion according to an embodiment of the present disclosure.
Figure 7B:
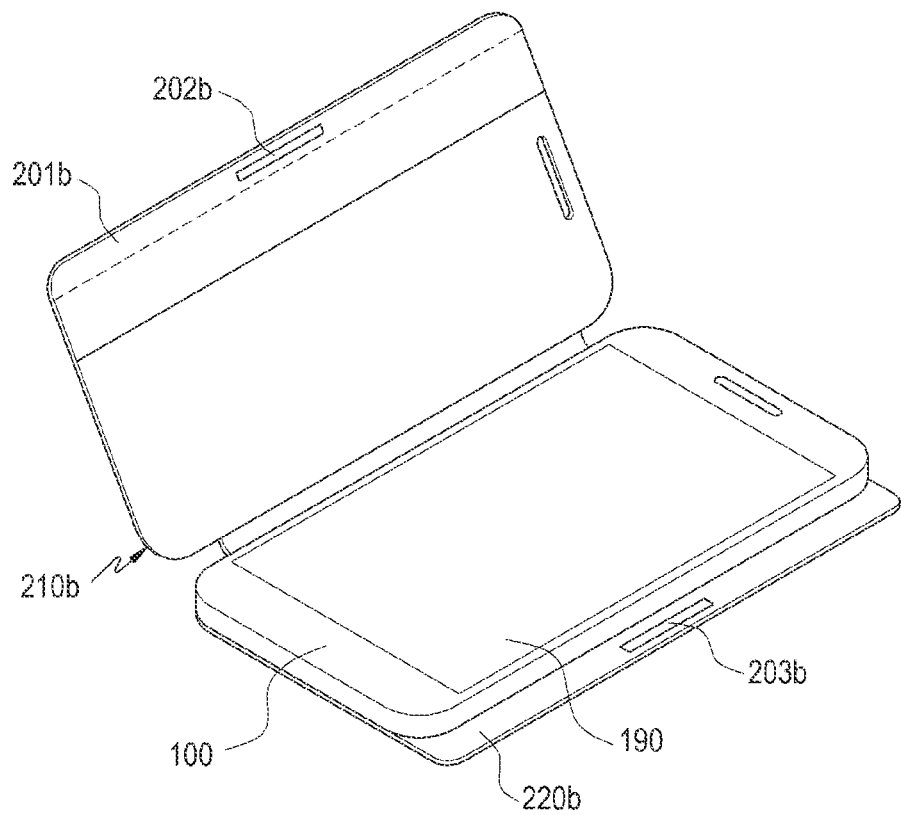
Figure 8:
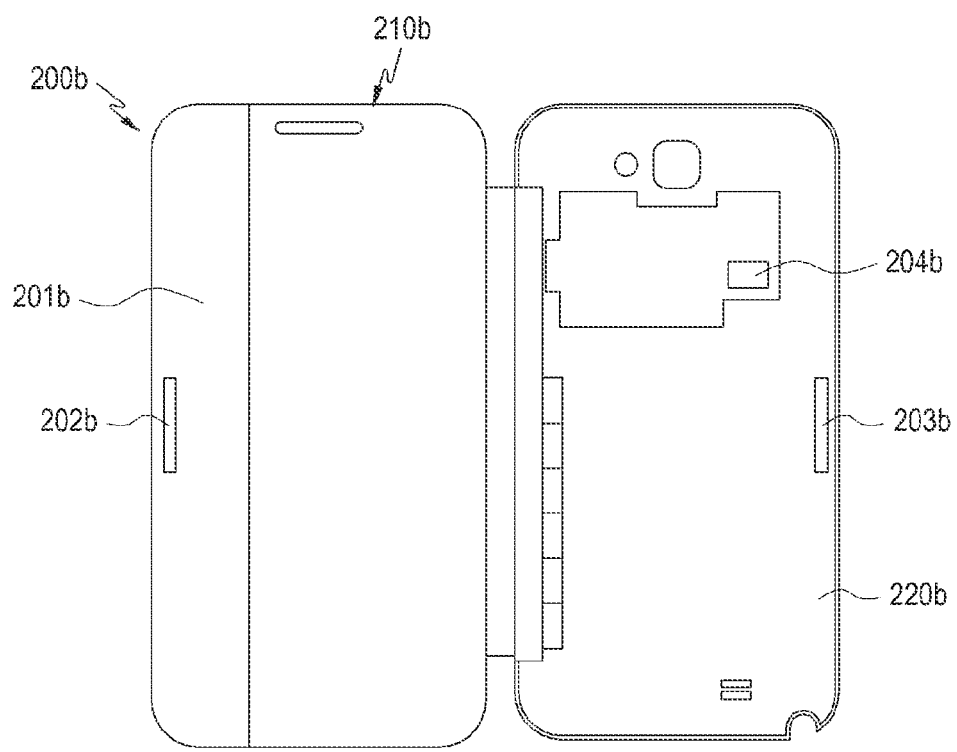
Figure 9A:
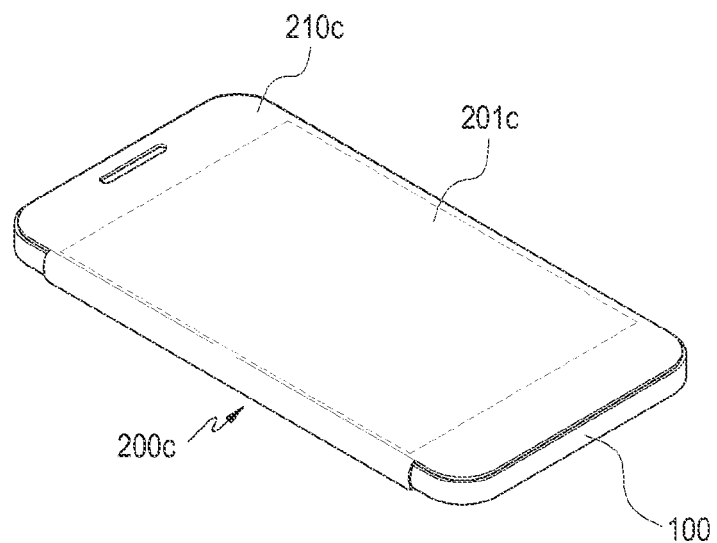
FIGS. 9A, 9B, and 10 schematically illustrate a mobile device and a cover with a screen projection portion according to an embodiment of the present disclosure.
Figure 9B:
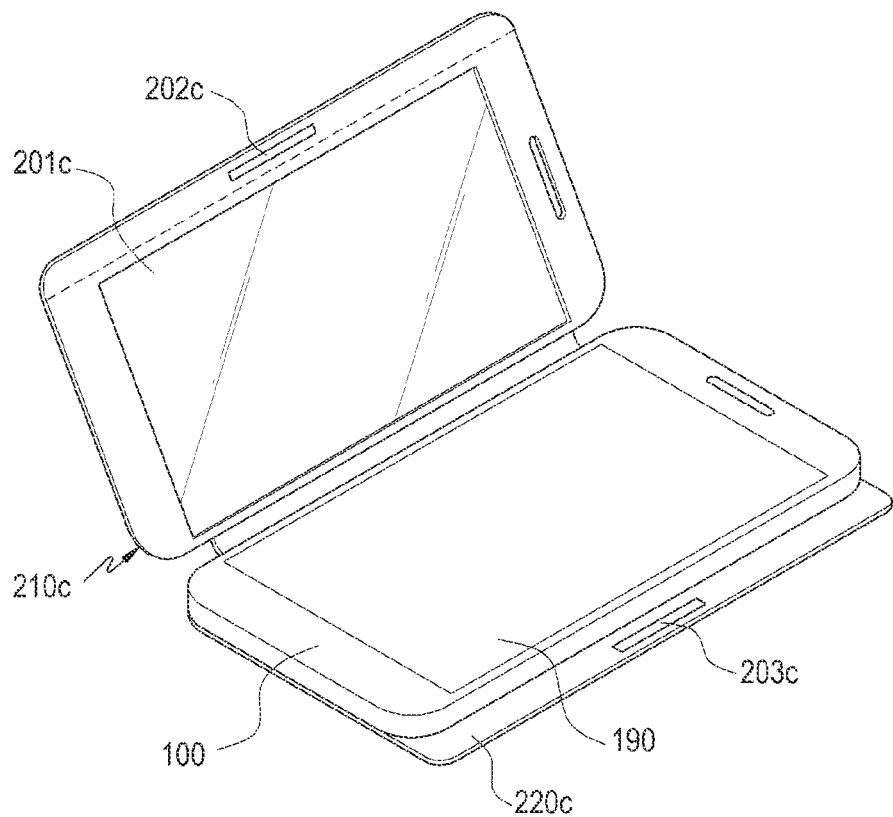
Figure 10:
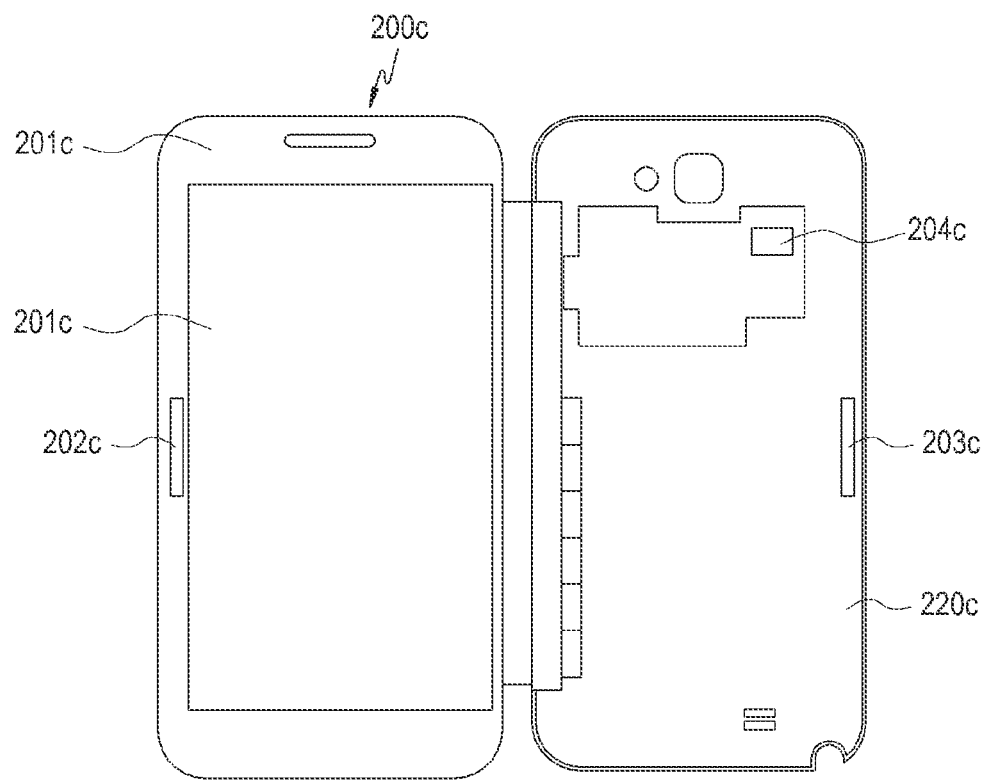

FIGS. 4A, 4B, 5, and 6 schematically illustrate a mobile device and a cover with a screen projection portion according to an embodiment of the present disclosure. FIGS. 7A, 7B, and 8 schematically illustrate a mobile device and a cover with a screen projection portion according to an embodiment of the present disclosure. FIGS. 9A, 9B, and 10 schematically illustrate a mobile device and a cover with a screen projection portion according to an embodiment of the present disclosure.

First, reference will be made to FIGS. 4A, 4B, 5, and 6, to describe a mobile device and a cover with a screen projection portion according to an embodiment of the present disclosure. In all various embodiments of the present disclosure, like reference numerals will be understood to refer to like parts, components, and structures. The mobile device 100 in the present disclosure may be alternately equipped with covers 200a, 200b and 200c which are provided in accordance with different various embodiments.

Figure 4A:
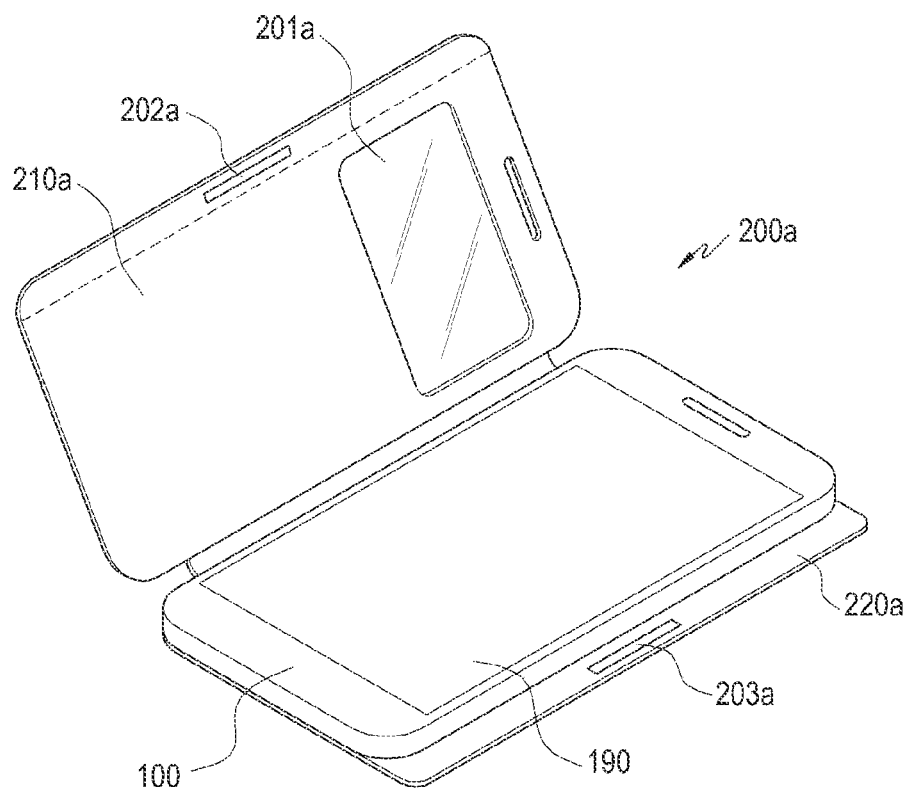
FIGS. 4A, 4B, 5, and 6 schematically illustrate a mobile device and a cover with a screen projection portion according to an embodiment of the present disclosure.
Figure 4B:
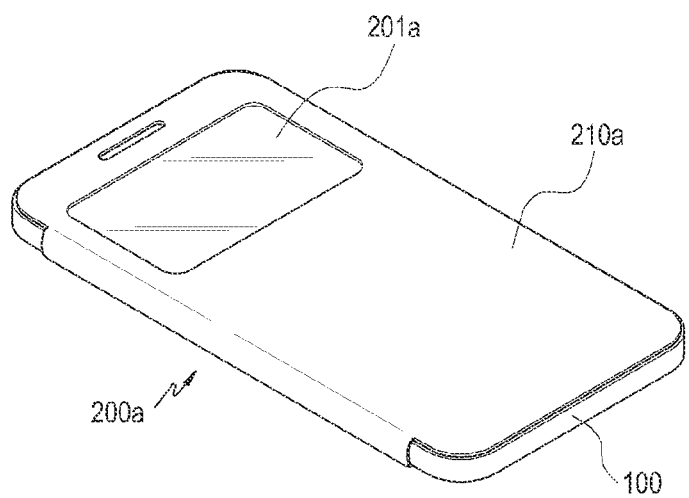

FIGS. 4A and 4B schematically illustrate a mobile device and a cover with a screen projection portion according to an embodiment of the present disclosure.

Referring to FIG. 4A, the mobile device 100 may be covered with a cover 200a including a screen projection portion 201a. The cover 200a may include a front cover portion 210a and a rear cover portion 220a.

Referring to FIG. 4B, if the mobile device 100 is covered with the cover 200a, a screen of the touch screen 190 mounted on the mobile device 100 may be exposed (e.g., viewable) through the screen projection portion 201a. For example, the screen projection portion 201a may be formed of a transparent member. Therefore, if a screen of the mobile device 100 is exposed through the screen projection portion 201a of the cover 200a, the screen can be seen outside through the screen projection portion 201a.

For example, as illustrated in FIGS. 4A and 4B the screen projection portion 201a may be formed in a position corresponding to an upper portion of the mobile device 100, on the cover 200a. However, the screen projection portion 201a may be formed in various other positions on the cover 200a.

The front cover portion 210a may include an attached portion 202a, and the rear cover portion 220a may include an attached portion 203a. In detecting an open state of the cover 200a, the controller 110 may detect the open state of the cover 200a by detecting separation between the attached portion 202a of the front cover portion 210a and the attached portion 203a of the rear cover portion 220a.

Figure 5:
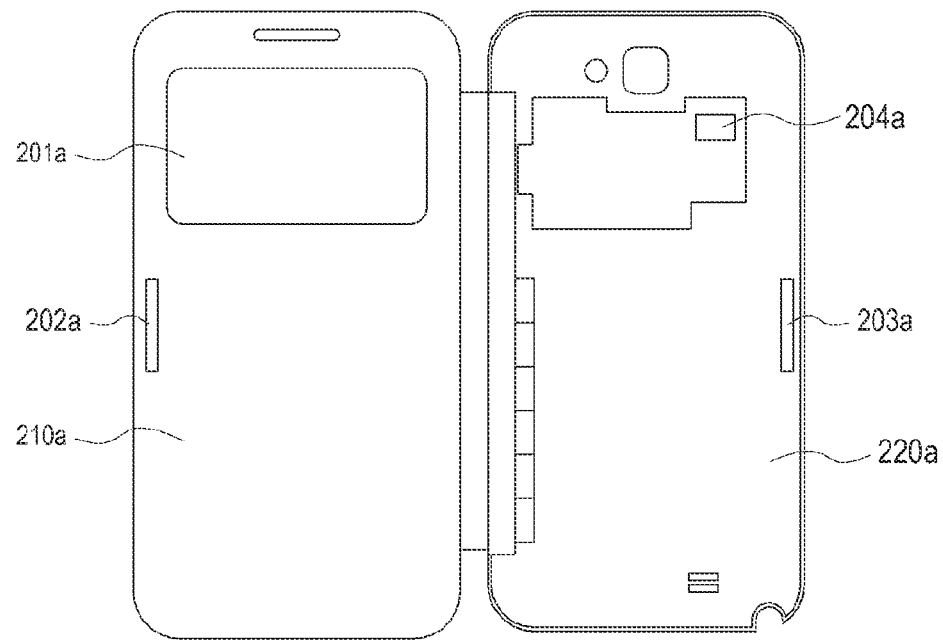

FIG. 5 schematically illustrates a cover for covering a mobile device such as, for example, the mobile device 100 illustrated in FIGS. 4A and 4B according to an embodiment of the present disclosure.

Referring to FIG. 5, the rear cover portion 220a of the cover 200a may be formed as a battery cover. For example, the rear cover portion 220a may be provided as a component for covering a battery (not shown) mounted on the rear of the mobile device 100. As described above, the cover 200a may include the screen projection portion 201a, and a screen of the mobile device 100 may be exposed through the screen projection portion 201a. The screen projection portion 201a may be provided to allow the user to visually check or view a screen displayed on the touch screen 190, while covering the front of the touch screen 190. For example, the screen projection portion 201a may be formed of a transparent member.

As described above, on the cover 200a may be formed the attached portion 202a of the front cover portion 210a and the attached portion 203a of the rear cover portion 220a. In addition, on the cover 200a may be formed a contact terminal 204a that can be electrically connected to the mobile device 100. As described below, the mobile device 100 may include a connection terminal that can be electrically connected to the contact terminal 204a. Using the connection terminal, the controller 110 of the mobile device 100 may determine whether the attached portion 202a of the front cover portion 210a of the cover 200a is spaced apart (or separated) from the attached portion 203a of the rear cover portion 220a. As an example, the attached portions 202a and 203a may be formed of a magnet. If the attached portion 202a of the front cover portion 210a is spaced apart from the attached portion 203a of the rear cover portion 220a, a change in electrical signal may occur. The controller 110 of the mobile device 100 may determine that the attached portion 202a of the front cover portion 210a is spaced apart from the attached portion 203a of the rear cover portion 220a, by receiving the change in electrical signal through the contact terminal 204a of the cover 200a and the connection terminal of the mobile device 100. For example, the controller 110 may determine that the attached portion 202a of the front cover portion 210a is spaced apart from the attached portion 203a of the rear cover portion 220a by detecting a change in an electrical signal received through the contact terminal 204a of the cover 200a and the connection terminal of the mobile device 100. Similarly, the controller 110 may determine when the attached portion 202a of the front cover portion 210a is in close relation to the attached portion 203a of the rear cover portion 220a by detecting a change in an electrical signal received through the contact terminal 204a of the cover 200a and the connection terminal of the mobile device 100.

An attached portion may be formed in the mobile device 100. The attached portion formed in the mobile device 100 may be formed of a member (such as a magnet or an iron) that can be magnetically attracted to the attached portion 202a of the front cover portion 210a of the cover 200a, or a member that can form a voltage difference due to the magnetic properties. The attached portion formed in the mobile device 100 may be formed on the rear of the touch screen 190 of the mobile device 100, or may be formed in a bezel part of the mobile device 100. If the attached portion 202a of the front cover portion 210a is spaced apart from the attached portion formed in the mobile device 100, a change in electrical signal may occur. The controller 110 of the mobile device 100 may determine that the attached portion 202a of the front cover portion 210a is spaced apart from the attached portion formed in the mobile device 100, by receiving (e.g., detecting) the change in electrical signal through the contact terminal 204a of the cover 200a and the connection terminal of the mobile device 100.

Figure 6:
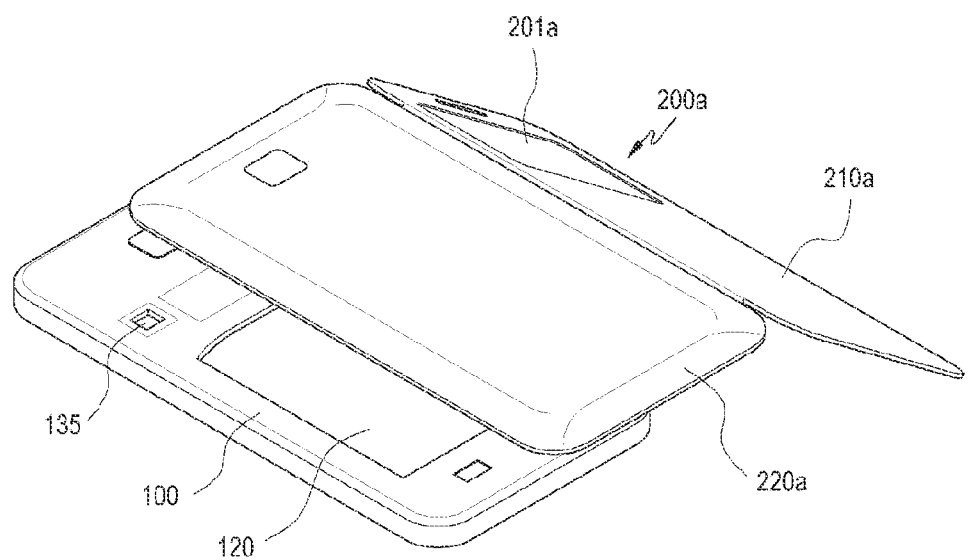

FIG. 6 schematically illustrates a rear of a mobile device and a cover such as, for example, the mobile device and the cover illustrated in FIGS. 4A and 4B according to an embodiment of the present disclosure.

Referring to FIG. 6, a connection terminal 135 may be mounted in the mobile device 100. The connection terminal 135, as described above, may be electrically connected to the contact terminal 204a of the cover 200a. Using the connection terminal 135, the controller 110 of the mobile device 100 may determine whether the attached portion 202a of the front cover portion 210a is spaced apart from the attached portion 203a of the rear cover portion 220a. As illustrated in FIG. 6, the rear cover portion 220a of the cover 200a may be formed as a battery cover for covering the battery (not shown) of the mobile device 100.

Although it is assumed in FIGS. 4A, 4B, 5, and 6 that the screen projection portion 201a is formed in an upper portion on the front cover portion 210a of the cover 200a, the screen projection portion 201a may be formed in various other positions. For example, as illustrated in FIGS. 7A, 7B, and 8, a screen projection portion 201b may be formed on one side of a front cover portion 210b of the cover 200b. For example, the screen projection portion 201b may be formed on the right side of the front cover portion 210b. The attached portion 202b may be disposed on the front cover portion 210b. The attached portion 203b may be disposed on the back cover portion 220b. The contact terminal 204b may be disposed on the back cover portion 220b and may be operatively connected to the mobile device 100.

According to various embodiments of the present disclosure, as illustrated in FIGS. 9A, 9B, and 10, a screen projection portion 201c may be formed in most of an area of a front cover portion 210c of the cover 200c (e.g., so as to form a significant portion of the front cover portion 210c). The attached portion 202c may be disposed on the front cover portion 210c. The attached portion 203c may be disposed on the back cover portion 220c. The contact terminal 204b may be disposed on the back cover portion 220c and may be operatively connected to the mobile device 100.

Figure 11:
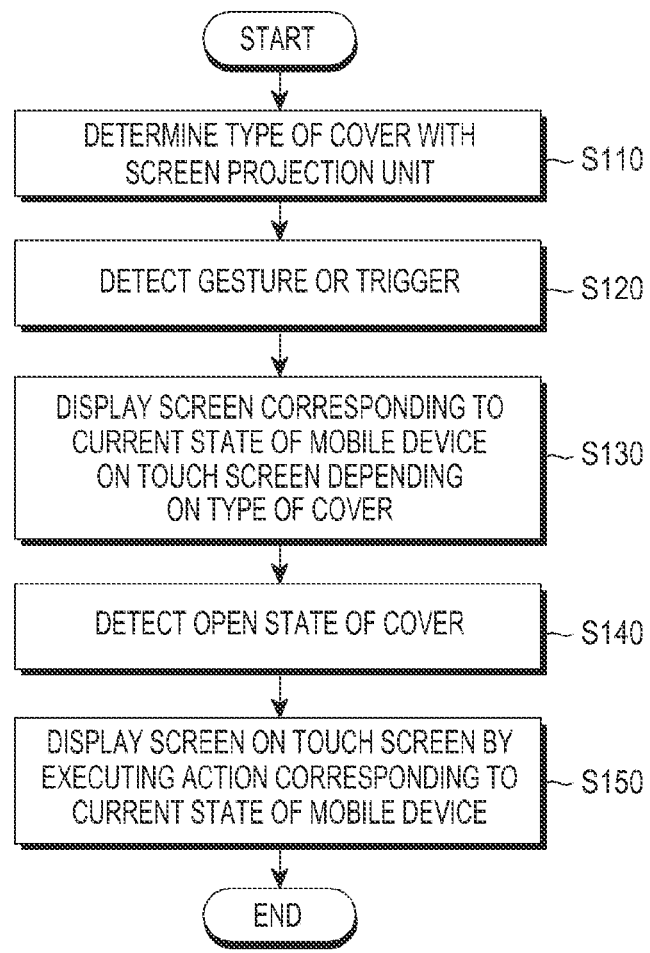
FIG. 11 is a flowchart illustrating a mobile device control method for displaying a screen depending on a type of a cover with a screen projection portion according to an embodiment of the present disclosure.
Figure 12:
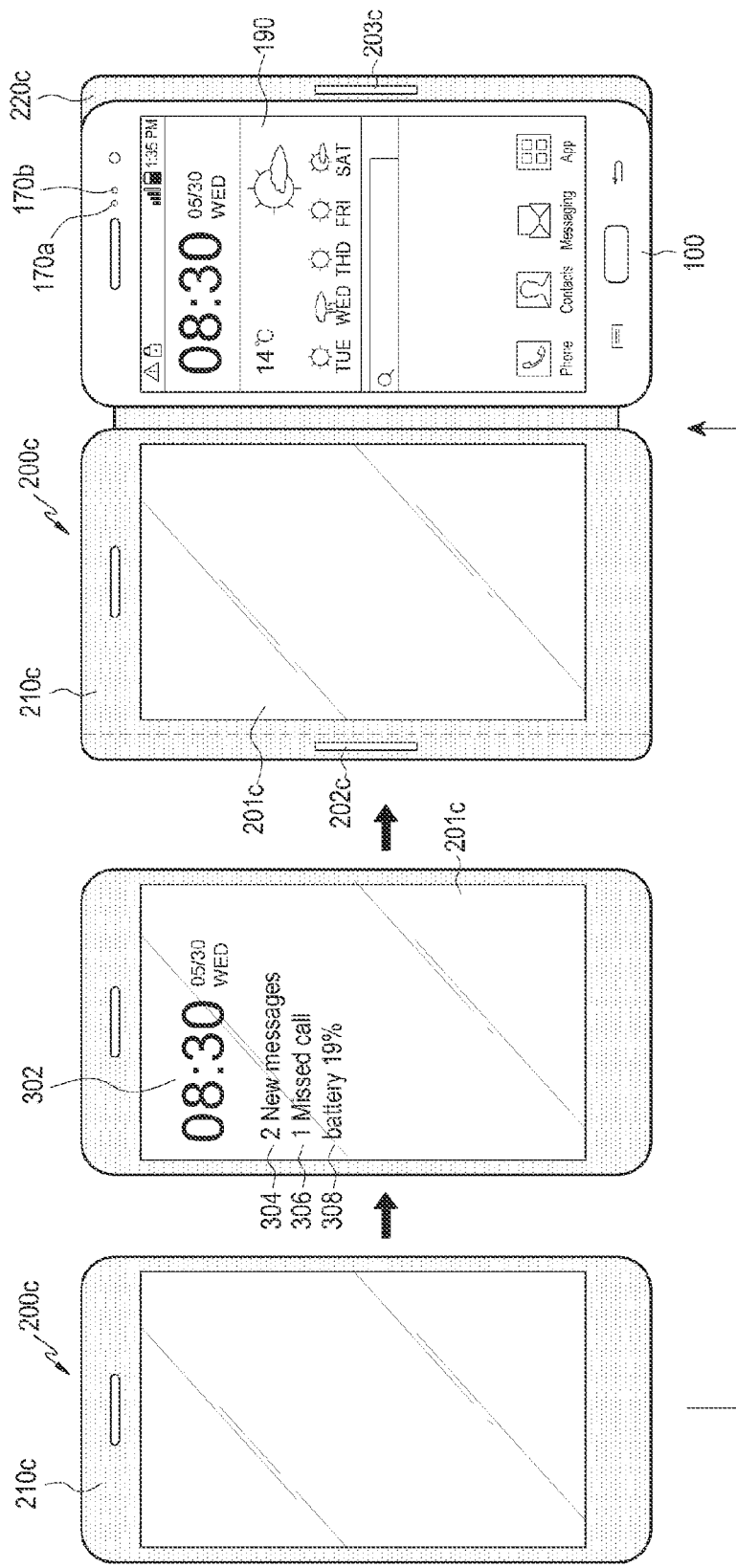
FIGS. 12A, 12B, and 12C illustrate a mobile device that displays a screen depending on a type of a cover with a screen projection portion according to an embodiment of the present disclosure.

FIG. 11 is a flowchart illustrating a mobile device control method for displaying a screen depending on a type of a cover with a screen projection portion according to an embodiment of the present disclosure, and FIGS. 12A, 12B, and 12C illustrate a mobile device that displays a screen depending on a type of a cover with a screen projection portion according to an embodiment of the present disclosure.

Referring to FIG. 11, in the mobile device control method for displaying a screen depending on a type of a cover with a screen projection portion according to various embodiments of the present disclosure, at operation S110, the controller 110 of the mobile device 100 may detect a type of a cover with a screen projection portion. Specifically, the controller 110 may determine a type of the cover with a screen projection portion. The controller 110 may detect a type of the cover using a category Identifier (ID) of the cover. The category ID may include information about at least one of a position and a size of the screen projection portion on the cover, and a visual tone of the cover. According to various embodiments of the present disclosure, a user may configure the mobile device in order to input the type of the cover (e.g., so as to define the cover type in the mobile device settings or preferences).

The mobile device 100 may include a connection terminal that can be electrically connected to a contact terminal of the cover. On the cover may be formed a contact terminal that can be electrically connected to the mobile device 100. Therefore, the controller 110 of the mobile device 100 may receive data including the category ID through the connection terminal that is electrically connected to the contact terminal of the cover. The controller 110 may detect a type of the cover using the received data including the category ID.

Referring to FIGS. 12A, 12B, and 12C, the mobile device 100 is covered with a cover 200c with a screen projection portion 201c. The cover 200c illustrated in FIGS. 12A, 12B, and 12C may correspond to an example in which the screen projection portion 201c described in FIGS. 9A, 9B and 10 is formed in most area of the front cover portion 210c. The controller 110 may detect a type of the cover 200c using the category ID of the cover 200c. The category ID may include information about at least one of a position and a size of the screen projection portion on the cover, and a vision tone of the cover. Therefore, the cover 200c illustrated in FIGS. 12A 12B, and 12C may have the category ID including information indicating that the position and size of the screen projection portion 201c correspond to most area of the front cover portion 210c. The controller 110 of the mobile device 100 may receive data including the category ID through the connection terminal 135 (see FIG. 6) that is electrically connected to a contact terminal 204c of the cover 200c. Therefore, the controller 110 may detect a type of the cover 200c using the received data including the category ID. For example, using the category ID, the controller 110 may determine that the type of the cover 200c corresponds to a cover in which the position and size of the screen projection portion 201c correspond to most area of the front cover portion 210c.

At operation S120, the controller 110 may detect a gesture or a trigger. Specifically, the controller 110 of the mobile device 100 may detect a gesture or a trigger. The gesture may be a press on (e.g., a gesture to press) the button 161 formed on the mobile device 100, or a touch on (e.g., a gesture to touch) the touch screen 190. For example, as illustrated in FIG. 12A, the controller 110 may detect a press on a button such as the Home button 161a illustrated in FIG. 2. The trigger may be generated in the mobile device 100, or may be received from an external device. For example, the trigger may be reception of a call, or occurrence of a notification.

Next, upon detecting the gesture or the trigger at operation S120, the mobile device 100 may proceed to operation S130 at which the controller 110 may display a screen corresponding to the current state of the mobile device 100 on the touch screen 190 depending on the type of the cover. Specifically, upon detecting the gesture or the trigger, the controller 110 may display a screen corresponding to the current state of the mobile device 100 on the touch screen 190 depending on the type of the cover. When displaying a screen corresponding to the current state of the mobile device 100 on the touch screen 190 depending on the type of the cover, the controller 110 may display the screen on the touch screen 190 so as to expose the screen depending on the position of the screen projection portion of the cover. If the current state of the mobile device 100 is a locked state, the screen may include information about at least one of time, notifications, and battery status. Therefore, upon detecting the gesture or the trigger while the current state of the mobile device 100 is a locked state, the controller 110 may display on the touch screen 190 the screen including information about at least one of time, notifications, battery status, and/or the like.

For example, as illustrated in FIG. 12B, upon detecting a gesture corresponding to a press on the Home button 161a at operation S120, the controller 110 may display a screen corresponding to the current state of the mobile device 100 on the touch screen 190 depending on the type of the cover. When displaying a screen corresponding to the current state of the mobile device 100 on the touch screen 190 depending on the type of the cover, the controller 110 may display the screen on the touch screen 190 so as to expose the screen depending on the position of the screen projection portion of the cover. Because the controller 110 determined at operation S110 that the type of the cover corresponds to a cover in which the position and size of the screen projection portion 201c correspond to most area of the front cover portion 210c, the controller 110 may display the screen in most area of the front cover portion 210c. For example, the controller 110 may display the screen in most area of the touch screen 190 of the mobile device 100, which corresponds to most area of the front cover portion 210c. If the current state of the mobile device 100 is a locked state, then, as illustrated in FIG. 12B, the controller 110 may display the screen including information about time 302, notifications 304 and 306, and battery status 308, and/or the like on the touch screen 190.

Therefore, according to various embodiments of the present disclosure, the controller 110 may display a screen corresponding to the current state of the mobile device 100 on the touch screen 190 depending on the type of the cover. In particular, according to various embodiments of the present disclosure, the controller 110 may display the screen on the touch screen 190 so as to expose the screen depending on the position of the screen projection portion of the cover. Therefore, according to various embodiments of the present disclosure, the controller 110 may protect the mobile device 100 and the touch screen 190 and expose the screen through the screen projection portion by covering the mobile device 100 with the cover. As a result, according to various embodiments of the present disclosure, the user may protect the mobile device 100 using the cover, and view the screen on the touch screen 190 through the screen projection portion. In addition, according to various embodiments of the present disclosure, upon detecting a gesture or a trigger while the current state of the mobile device 100 is a locked state, the controller 110 may display a screen including information about at least one of time, notifications battery status, and/or the like on the touch screen 190 corresponding to the screen projection portion. Therefore, according to various embodiments of the present disclosure, the user may check the screen on the touch screen 190 through the screen projection portion even while the mobile device 100 covered with the cover is in a locked state.

At operation S140, the controller 110 may detect an open state of the cover. Specifically, the controller 110 may detect an open state of the cover. For example, the controller 110 may detect the cover being transitioned (or changed to) an open state. The cover may include a front cover portion and a rear cover portion, and the controller 110 may detect an open state of the cover by detecting separation between an attached portion of the front cover portion and an attached portion of the rear cover portion. The attached portion may be formed of a magnet. If the attached portion of the front cover portion is spaced apart from the attached portion of the rear cover portion, a change in electrical signal may occur. The controller 110 of the mobile device 100 may determine that the attached portion of the front cover portion is spaced apart from the attached portion of the rear cover portion, by receiving (e.g., detecting) the change in electrical signal through the contact terminal of the cover and the connection terminal of the mobile device 100.

Alternatively, according to various embodiments of the present disclosure, the controller 110 may detect an open state of the cover by detecting separation between the attached portion of the front cover portion and the attached portion formed in the mobile device 100. The attached portion formed in the mobile device 100 may be formed of a member (such as a magnet or an iron) that can be magnetically attracted to the attached portion of the front cover portion. The attached portion formed in the mobile device 100 may be formed on the rear of the touch screen 190 of the mobile device 100, or may be formed in a bezel part of the mobile device 100. If the attached portion of the front cover portion is spaced apart from the attached portion formed in the mobile device 100, a change in electrical signal may occur. The controller 110 of the mobile device 100 may determine that the attached portion of the front cover portion is spaced apart from the attached portion formed in the mobile device 100, by receiving (e.g., detecting) the change in electrical signal through the contact terminal of the cover and the connection terminal of the mobile device 100.

For example, as illustrated in FIG. 12C, the cover 200c may include the front cover portion 210c with an attached portion 202c and a rear cover portion 220c with an attached portion 203c. Therefore, if the cover 200c is opened, a change in electrical signal may occur due to occurrence of separation between the front cover portion 210c and the rear cover portion 220c. The occurred change in electrical signal may be transmitted to the connection terminal 135 illustrated in FIG. 6 of the mobile device 100 through the contact terminal 204c illustrated in FIG. 10 formed on the cover. Therefore, the controller 110 of the mobile device 100 may detect the open state of the cover by recognizing (e.g., detecting) the change in electrical signal, which is received through the connection terminal 135.

Alternatively, according to various embodiments of the present disclosure, the controller 110 may detect an open state of the cover using an illuminance sensor or a proximity sensor mounted on the mobile device 100. For example, the controller 110 may detect the open state of the cover using the illuminance sensor 170a or the proximity sensor 170b illustrated in FIGS. 2 and 12C. For example, if the front cover portion 210c of the cover 200c in FIG. 12C is opened, the controller 110 may detect a change in illuminance through the illuminance sensor 170a. If the front cover portion 210c of the cover 200c is opened, the controller 110 may determine that the front cover portion 210c moves away from the mobile device 100 after in close proximity to the mobile device 100. Therefore, if the front cover portion 210c of the cover 200c is opened, the controller 110 may detect the open state of the cover 200c using the illuminance sensor 170a or the proximity sensor 170b.

Figure 17:
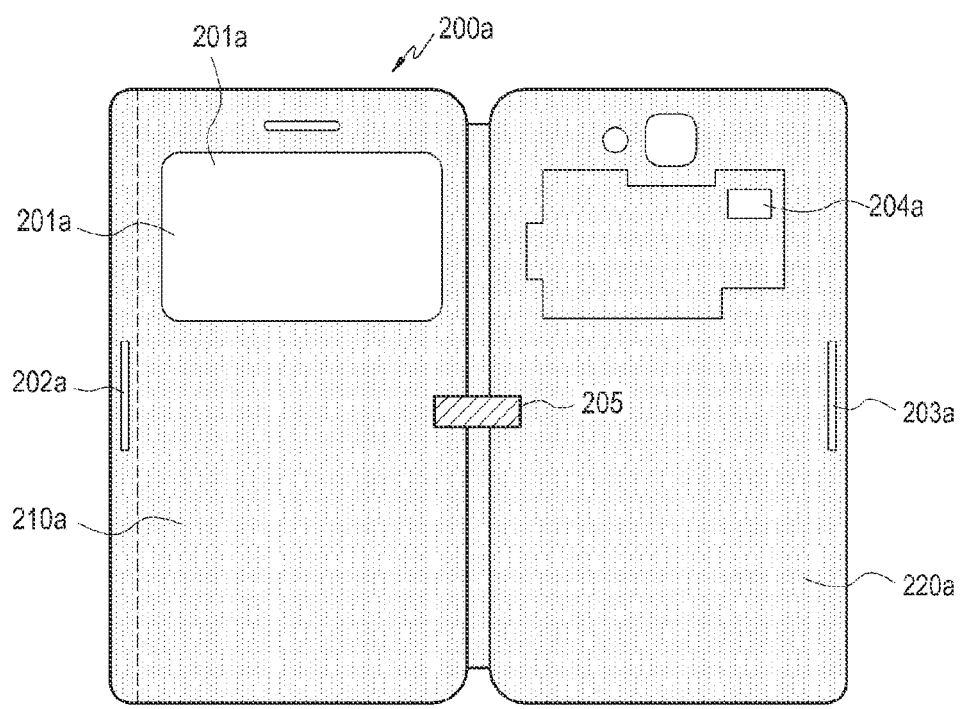
FIG. 17 schematically illustrates a cover for covering a mobile device according to an embodiment of the present disclosure.

Alternatively, according to various embodiments of the present disclosure, the controller 110 may detect an open state of the cover using a folded-state detection sensor 205 illustrated in FIG. 17 formed between the front cover portion and the rear cover portion of the cover.

FIG. 17 schematically illustrates a cover for covering a mobile device according to an embodiment of the present disclosure.

Referring to FIG. 17, the folded-state detection sensor 205 may be formed between the front cover portion 210a and the rear cover portion 220a of the cover. For example, if the front cover portion 210a is opened moving away from the rear cover portion 220a, the folded-state detection sensor 205 may also be opened (or unfolded at 180° after being folded). In this case, a change in electrical signal may occur in the folded-state detection sensor 205. The occurred change in electrical signal may be transmitted to the mobile device 100 through the contact terminal 204a formed on the cover 200a. For example, the controller 110 of the mobile device 100 may receive the change in electrical signal through the connection terminal 135 that is formed in the mobile device 100 and electrically connected to the contact terminal 204a of the cover. Therefore, the controller 110 may detect the open state of the cover by recognizing (e.g., detecting) the received change in electrical signal.

Upon detecting the open state of the cover at operation S140, the mobile device proceeds to operation S150 at which the controller 110 may display a screen on the touch screen 190 by executing an action corresponding to the current state of the mobile device 100. Specifically, upon detecting the open state of the cover at operation S140, the controller 110 may display a screen on the touch screen 190 by executing an action corresponding to the current state of the mobile device 100. The action corresponding to the current state of the mobile device 100 may be stored in the storage unit 175 in advance. For example, if the current state of the mobile device 100 is a locked state, the action may be an unlock action. Referring to FIG. 12B, the current state of the mobile device 100 is a locked state. Upon detecting the open state of the cover 200c, the controller 110 may execute an unlock action corresponding to the current state of the mobile device 100. Therefore, as illustrated in FIG. 12C, if the mobile device 100 is unlocked, the controller 110 may display the home screen on the touch screen 190. In addition, if the mobile device 100 is unlocked, the mobile device 100 may be controlled as a touch is input or made on the touch screen 190. Therefore, according to various embodiments of the present disclosure, upon detecting an open state of the cover, the controller 110 may display a screen on the touch screen 190 by executing an action corresponding to the current state of the mobile device 100.

Figure 13:
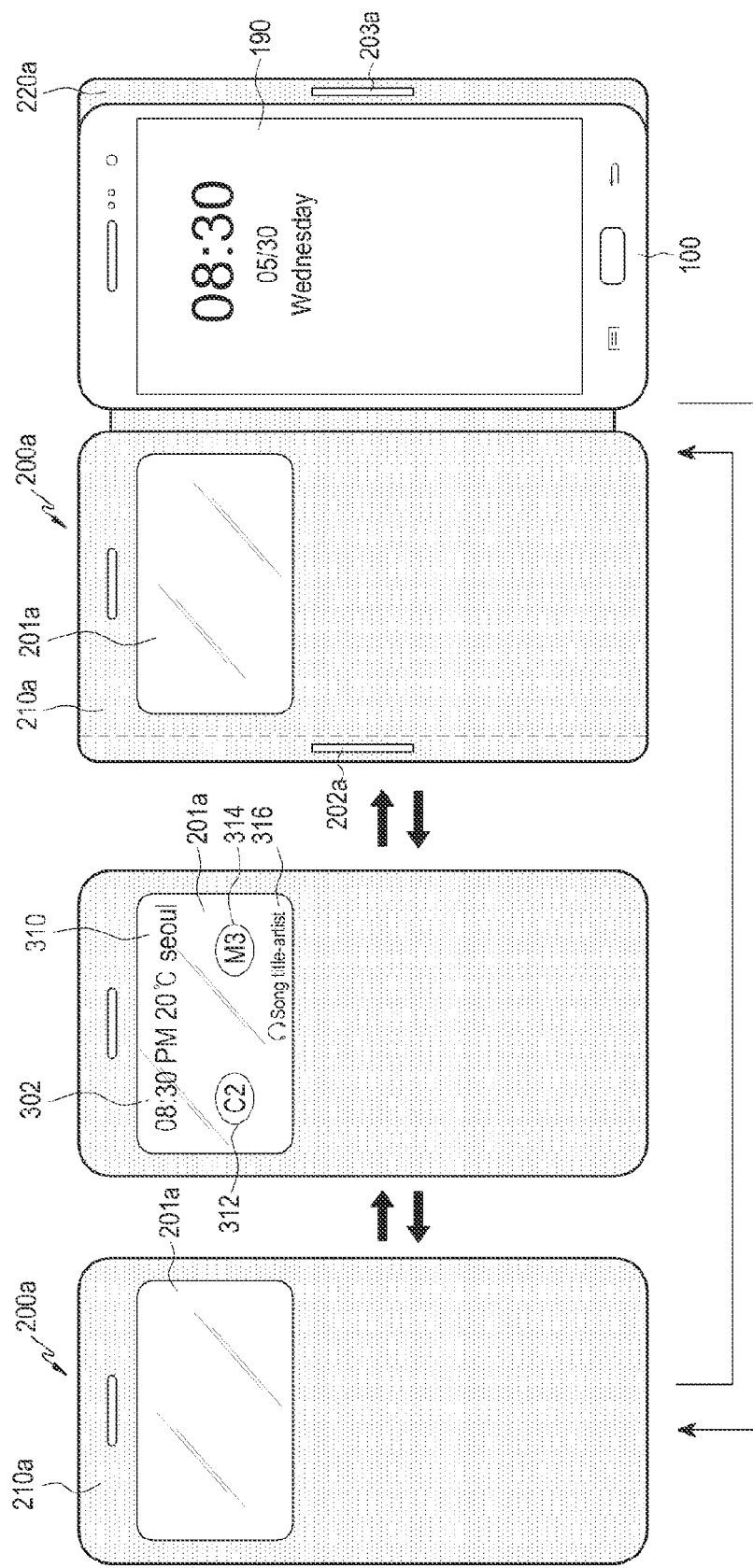
FIGS. 13A, 13B and 13C illustrate a mobile device that displays a screen depending on a type of a cover with a screen projection portion according to a first embodiment of the present disclosure.

FIGS. 13A, 13B, and 13C illustrate a mobile device that displays a screen depending on a type of a cover with a screen projection portion according to a first embodiment of the present disclosure. The first embodiment of the present disclosure is similar in operation to the various embodiments of the present disclosure described in relation to FIGS. 11, 12A, 12B, and 12C, so the same description will be omitted.

Referring back to FIG. 11, in the mobile device control method for displaying a screen depending on a type of a cover with a screen projection portion according to the first embodiment of the present disclosure, at operation S110, the controller 110 may detect a type of a cover with a screen projection portion. Specifically, the controller 110 may determine a type of the cover using a category ID of the cover. The category ID may include information about at least one of a position and a size of the screen projection portion on the cover, and a visual tone of the cover. The controller 110 of the mobile device 100 may receive data including the category ID through the connection terminal that is electrically connected to the contact terminal of the cover. The controller 110 may determine a type of the cover using the received data including the category ID.

Referring to FIGS. 13A, 13B, and 13C, the mobile device 100 is covered with the cover 200a with the screen projection portion 201a. The cover 200a illustrated in FIGS. 13A, 13B, and 13C may correspond to an example in which the screen projection portion 201a described in relation to FIGS. 4A, 4B and 5 is formed in an upper portion of the front cover portion 210a. The controller 110 may detect a type of the cover 200a using a category ID of the cover 200a. The cover 200a illustrated in FIGS. 13A, 13B, 13C may have the category ID including information indicating that the position of the screen projection portion 201a corresponds to an upper portion of the front cover portion 210a and the size of the screen projection portion 201a corresponds to ⅓ of the front cover portion 210a. The controller 110 of the mobile device 100 may receive data including the category ID through the connection terminal 135 illustrated in FIG. 6 that is electrically connected to the contact terminal 204a of the cover 200a. Therefore, the controller 110 may detect a type of the cover 200a using the received data including the category ID. For example, using the category ID, the controller 110 may determine that the type of the cover 200a corresponds to a cover in which the position of the screen projection portion 201a corresponds to an upper portion of the front cover portion 210a and the size of the screen projection portion 201a corresponds to ⅓ of the front cover portion 210a.

At operation S120, the controller 110 may detect a gesture or a trigger. Specifically, the controller 110 of the mobile device 100 may detect a gesture or a trigger. The gesture may be a press on (e.g., a gesture to press) the button 161 formed on the mobile device 100, or a touch on (e.g., a gesture to touch) the touch screen 190. For example, in FIG. 13A, the controller 110 may detect a press on the Home button 161a illustrated FIG. 2.

Upon detecting the gesture or the trigger at operation S120, the mobile device 100 may proceed to operation S130 at which the controller 110 may display a screen corresponding to the current state of the mobile device 100 on the touch screen 190 depending on the type of the cover. Specifically, upon detecting the gesture or the trigger, the controller 110 may display a screen corresponding to the current state of the mobile device 100 on the touch screen 190 depending on the type of the cover. When displaying a screen corresponding to the current state of the mobile device 100 on the touch screen 190 depending on the type of the cover, the controller 110 may display the screen on the touch screen 190 so as to expose the screen depending on the position of the screen projection portion of the cover. If the current state of the mobile device 100 is a locked state, the screen may include information about at least one of time, notifications, and battery status. Therefore, upon detecting the gesture or the trigger while the current state of the mobile device 100 is a locked state, the controller 110 may display on the touch screen 190 the screen including information about at least one of time, notifications, and battery status.

For example, as illustrated in FIG. 13B, upon detecting a gesture corresponding to a press on the Home button 161a at operation S120, the controller 110 may display a screen corresponding to the current state of the mobile device 100 on the touch screen 190 depending on the type of the cover. When displaying a screen corresponding to the current state of the mobile device 100 on the touch screen 190 depending on the type of the cover, the controller 110 may display the screen on the touch screen 190 so as to expose the screen depending on the position of the screen projection portion of the cover. Because the controller 110 determined, at operation S110, that the type of the cover corresponds to a cover in which the position of the screen projection portion 201a corresponds to an upper portion of the front cover portion 210a and the size of the screen projection portion 201a corresponds to ⅓ of the front cover portion 210a, the controller 110 may display the screen in an upper portion of the front cover portion 210a. For example, the controller 110 may display the screen in an upper portion of the touch screen 190 of the mobile device 100, which corresponds to an upper portion of the front cover portion 210a. If the current state of the mobile device 100 is a locked state, then, as illustrated in FIG. 13B, the controller 110 may display the screen including information about time 302, weather 310, notifications 312 and 314, title or artist 316 of the audio being played, and/or the like on the touch screen 190. Therefore, according to various embodiments of the present disclosure, the controller 110 may display a screen corresponding to the current state of the mobile device 100 on the touch screen 190 depending on the type of the cover.

At operation S140, the controller 110 may detect an open state of the cover. The cover may include a front cover portion and a rear cover portion, and the controller 110 may detect an open state of the cover by detecting separation between an attached portion of the front cover portion and an attached portion of the rear cover portion. For example, as illustrated in FIG. 13C, the cover 200a may include the front cover portion 210a with the attached portion 202a and the rear cover portion 220a with the attached portion 203a. Therefore, if the cover 200a is opened, a change in electrical signal may occur due to occurrence of separation between the front cover portion 210a and the rear cover portion 220a. The occurred change in electrical signal may be transmitted to the connection terminal 135 illustrated in FIG. 6 of the mobile device 100 through the contact terminal 204a illustrated in FIG. 5 formed on the cover. Therefore, the controller 110 of the mobile device 100 may detect the open state of the cover by recognizing (e.g., detecting) the change in electrical signal, which is received through the connection terminal 135. Alternatively, according to various embodiments of the present disclosure, the controller 110 may detect an open state of the cover using an illuminance sensor or a proximity sensor mounted on the mobile device 100. As another alternative, according to various embodiments o of the present disclosure, the controller 110 may detect an open state of the cover using the folded-state detection sensor 205 illustrated in FIG. 17 formed between the front cover portion and the rear cover portion of the cover.

Upon detecting the open state of the cover at operation S140, the mobile device 100 may proceed to operation S150 at which the controller 110 may display a screen on the touch screen 190 by executing an action corresponding to the current state of the mobile device 100. Specifically, upon detecting the open state of the cover at operation S140, the controller 110 may display a screen on the touch screen 190 by executing an action corresponding to the current state of the mobile device 100. The action corresponding to the current state of the mobile device 100 may be stored in the storage unit 175 in advance. For example, if the current state of the mobile device 100 is a locked state, the action may be an action to display a lock screen. Referring to FIG. 13B, the current state of the mobile device 100 is a locked state. Upon detecting the open state of the cover 200a, the controller 110 may execute an action to display a lock screen, which corresponds to the current state of the mobile device 100. Therefore, as illustrated in FIG. 13C, the controller 110 may display the lock screen on the touch screen 190. The lock screen is not the screen illustrated in FIG. 13B and corresponding to the position and size of the screen projection portion, but may correspond to the common lock screen spanning over the entire area of the touch screen 190.

Figure 14:
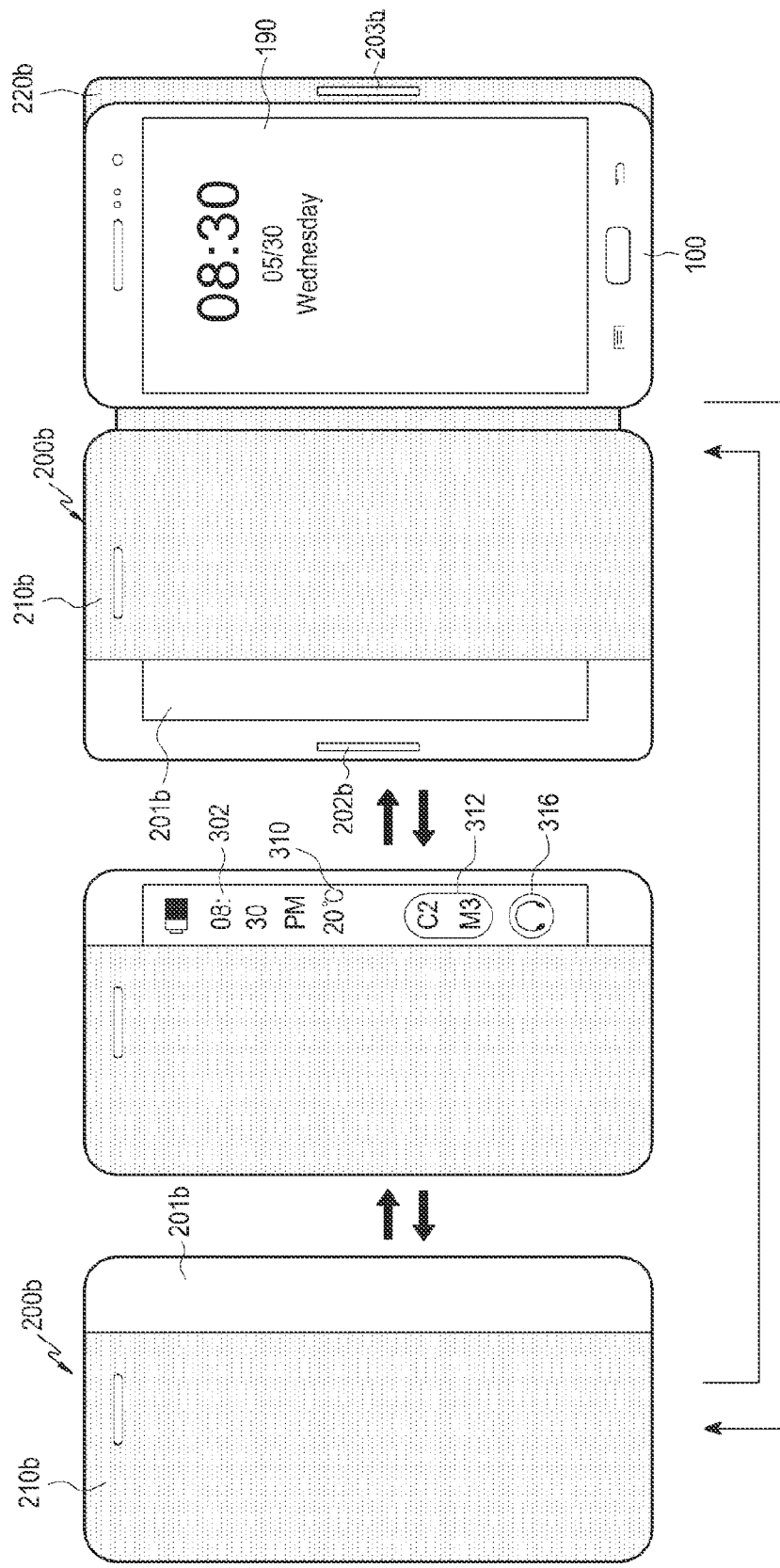
FIGS. 14A, 14B and 14C illustrate a mobile device that displays a screen depending on a type of a cover with a screen projection portion according to a second embodiment of the present disclosure.

FIGS. 14A, 14B, and 14C illustrate a mobile device that displays a screen depending on a type of a cover with a screen projection portion according to a second embodiment of the present disclosure. The second embodiment of the present disclosure is similar in operation to the various embodiments of the present disclosure described in relation to FIGS. 11, 12A, 12B, and 12C, so the same description will be omitted.

Referring back to FIG. 11, in the mobile device control method for displaying a screen depending on a type of a cover with a screen projection portion according to the second embodiment of the present disclosure, at operation S110, the controller 110 may detect a type of a cover with a screen projection portion. Specifically, the controller 110 may determine a type of the cover using a category ID of the cover. The category ID may include information about a position and a size of the screen projection portion on the cover, or about a visual tone of the cover. The controller 110 of the mobile device 100 may receive data including the category ID through the connection terminal that is electrically connected to the contact terminal of the cover. The controller 110 may determine a type of the cover using the received data including the category ID.

Referring to FIGS. 14A, 14B, and 14C, the mobile device 100 is covered with the cover 200b with the screen projection portion 201b. The cover 200b illustrated in FIGS. 14A, 14B, and 14C may correspond to an example in which the screen projection portion 201b described in FIGS. 7A, 7B and 8 is formed in one side corresponding to the right side of the front cover portion 210b. The controller 110 may detect a type of the cover 200b using a category ID of the cover 200b. The cover 200b illustrated in FIGS. 14A, 14B, and 14C may have the category ID including information indicating that the position of the screen projection portion 201b corresponds to the right side of the front cover portion 210b. The controller 110 of the mobile device 100 may receive data including the category ID through the connection terminal 135 illustrated in FIG. 6 that is electrically connected to the contact terminal 204b of the cover 200b. Therefore, the controller 110 may detect a type of the cover 200b using the received data including the category ID. For example, using the category ID, the controller 110 may determine that the type of the cover 200b corresponds to a cover in which the position of the screen projection portion 201b corresponds to the right side of the front cover portion 210b.

At operation S120, the controller 110 may detect a gesture or a trigger. Specifically, the controller 110 of the mobile device 100 may detect a gesture or a trigger. The gesture may be a press on (e.g., a gesture to press) the button 161 formed on the mobile device 100, or a touch on (e.g., a gesture to touch) the touch screen 190. For example, as illustrated in FIG. 14A, the controller 110 may detect a press on the Home button 161a illustrated FIG. 2.

Upon detecting the gesture or the trigger at operation S120, the mobile device 100 may proceed to operation S130 at which the controller 110 may display a screen corresponding to the current state of the mobile device 100 on the touch screen 190 depending on the type of the cover. Specifically, upon detecting the gesture or the trigger, the controller 110 may display a screen corresponding to the current state of the mobile device 100 on the touch screen 190 depending on the type of the cover. When displaying a screen corresponding to the current state of the mobile device 100 on the touch screen 190 depending on the type of the cover, the controller 110 may display the screen on the touch screen 190 so as to expose the screen depending on the position of the screen projection portion of the cover. If the current state of the mobile device 100 is a locked state, the screen may include information about at least one of time, notifications, battery status, and/or the like. Therefore, upon detecting the gesture or the trigger while the current state of the mobile device 100 is a locked state, the controller 110 may display on the touch screen 190 the screen including information about at least one of time, notifications, battery status, and/or the like.

For example, as illustrated in FIG. 14B, upon detecting a gesture corresponding to a press on the Home button 161a at operation S120, the controller 110 may display a screen corresponding to the current state of the mobile device 100 on the touch screen 190 depending on the type of the cover. When displaying a screen corresponding to the current state of the mobile device 100 on the touch screen 190 depending on the type of the cover, the controller 110 may display the screen on the touch screen 190 so as to expose the screen depending on the position of the screen projection portion of the cover. Because the controller 110 determined, at operation S110, that the type of the cover corresponds to a cover in which the position of the screen projection portion 201b corresponds to the right side of the front cover portion 210b, the controller 110 may display the screen on right side of the front cover portion 210b. For example, the controller 110 may display the screen on the right side of the touch screen 190 of the mobile device 100, which corresponds to the right side of the front cover portion 210b. If the current state of the mobile device 100 is a locked state, then as illustrated in FIG. 14B, the controller 110 may display the screen including information about time 302, weather 310, notifications 312, and indication 316 of audio being played, on the touch screen 190. Therefore, according to various embodiments of the present disclosure, the controller 110 may display a screen corresponding to the current state of the mobile device 100 on the touch screen 190 depending on the type of the cover.

At operation S140, the controller 110 may detect an open state of the cover. The cover may include a front cover portion and a rear cover portion, and the controller 110 may detect an open state of the cover by detecting separation between an attached portion of the front cover portion and an attached portion of the rear cover portion. For example, as illustrated in FIG. 14C, the cover 200b may include the front cover portion 210b with the attached portion 202b and the rear cover portion 220b with the attached portion 203b. Therefore, if the cover 200b is opened, a change in electrical signal may occur due to occurrence of separation between the front cover portion 210b and the rear cover portion 220b. The occurred change in electrical signal may be transmitted to the connection terminal 135 illustrated in FIG. 6 of the mobile device 100 through the contact terminal 204b illustrated in FIG. 8 formed on the cover. Therefore, the controller 110 of the mobile device 100 may detect the open state of the cover by recognizing (e.g., detecting) the change in electrical signal, which is received through the connection terminal 135. Alternatively, according to various embodiments of the present disclosure, the controller 110 may detect an open state of the cover using an illuminance sensor or a proximity sensor mounted on the mobile device 100. As another alternative, according to various embodiments of the present disclosure, the controller 110 may detect an open state of the cover using the folded-state detection sensor 205 illustrated in FIG. 17 formed between the front cover portion and the rear cover portion of the cover.

Upon detecting the open state of the cover at operation S140, the mobile device may proceed to operation S150 at which the controller 110 may display a screen on the touch screen 190 by executing an action corresponding to the current state of the mobile device 100. Specifically, upon detecting the open state of the cover at operation S140, the controller 110 may display a screen on the touch screen 190 by executing an action corresponding to the current state of the mobile device 100. The action corresponding to the current state of the mobile device 100 may be stored in the storage unit 175 in advance. For example, if the current state of the mobile device 100 is a locked state, the action may be an action to display a lock screen. Referring to FIG. 14B, the current state of the mobile device 100 is a locked state. Upon detecting the open state of the cover 200b, the controller 110 may execute an action to display a lock screen, which corresponds to the current state of the mobile device 100. Therefore, as illustrated in FIG. 14C, the controller 110 may display the lock screen on the touch screen 190. The lock screen is not the screen illustrated in FIG. 14B and corresponding to the position and size of the screen projection portion, but may correspond to the common lock screen spanning over the entire area of the touch screen 190.

FIGS. 15A, 15B, 15C, 15D, and 15E illustrate a scene of a mobile device that displays a screen depending on a type of a cover with a screen projection portion according to a third embodiment of the present disclosure. The third embodiment of the present disclosure is similar in operation to the embodiment of the present disclosure described in relation to FIGS. 11, 12A, 12B, and 12C, so the same description will be omitted.

Referring back to FIG. 11, in the mobile device control method for displaying a screen depending on a type of a cover with a screen projection portion according to the third embodiment of the present disclosure, at operation S110, the controller 110 may detect a type of a cover with a screen projection portion. Specifically, the controller 110 may determine a type of the cover using a category ID of the cover. The category ID may include information about at least one of a position and a size of the screen projection portion on the cover, and a visual tone of the cover. The controller 110 of the mobile device 100 may receive data including the category ID through the connection terminal that is electrically connected to the contact terminal of the cover. The controller 110 may determine a type of the cover using the received data including the category ID.

Referring to FIGS. 15A, 15B, 15C, 15D, and 15E, the mobile device 100 is covered with the cover 200a with the screen projection portion 201a. The cover 200a illustrated in FIGS. 15A, 15B, 15C, 15D, and 15E may correspond to an example in which the screen projection portion 201a described in FIGS. 4A, 4B and 5 is formed in an upper portion of the front cover portion 210a. The controller 110 may detect a type of the cover 200a using a category ID of the cover 200a. The cover 200a illustrated in FIGS. 15A, 15B, 15C, 15D, and 15E may have the category ID including information indicating that the position of the screen projection portion 201a corresponds to an upper portion of the front cover portion 210a and the size of the screen projection portion 201a corresponds to ⅓ of the front cover portion 210a. The controller 110 of the mobile device 100 may receive data including the category ID through the connection terminal 135 illustrated in FIG. 6 that is electrically connected to the contact terminal 204a of the cover 200a. Therefore, the controller 110 may detect a type of the cover 200a using the received data including the category ID. For example, using the category ID, the controller 110 may determine that the type of the cover 200a corresponds to a cover in which the position of the screen projection portion 201a corresponds to an upper portion of the front cover portion 210a and the size of the screen projection portion 201a corresponds to ⅓ of the front cover portion 210a.

At operation S120, the controller 110 may detect a gesture or a trigger. Specifically, the controller 110 of the mobile device 100 may detect a gesture or a trigger. The trigger may be generated in the mobile device 100, or may be received from an external device. For example, the trigger may be reception of a call, or occurrence of a notification. For example, in FIG. 15A, the controller 110 may detect a trigger such as call reception.

Upon detecting the gesture or the trigger at operation S120, the mobile device 100 may proceed to operation S130 at which the controller 110 may display a screen corresponding to the current state of the mobile device 100 on the touch screen 190 depending on the type of the cover. Specifically, upon detecting the gesture or the trigger, the controller 110 may display a screen corresponding to the current state of the mobile device 100 on the touch screen 190 depending on the type of the cover. When displaying a screen corresponding to the current state of the mobile device 100 on the touch screen 190 depending on the type of the cover, the controller 110 may display the screen on the touch screen 190 so as to expose the screen depending on the position of the screen projection portion of the cover.

Figure 15:
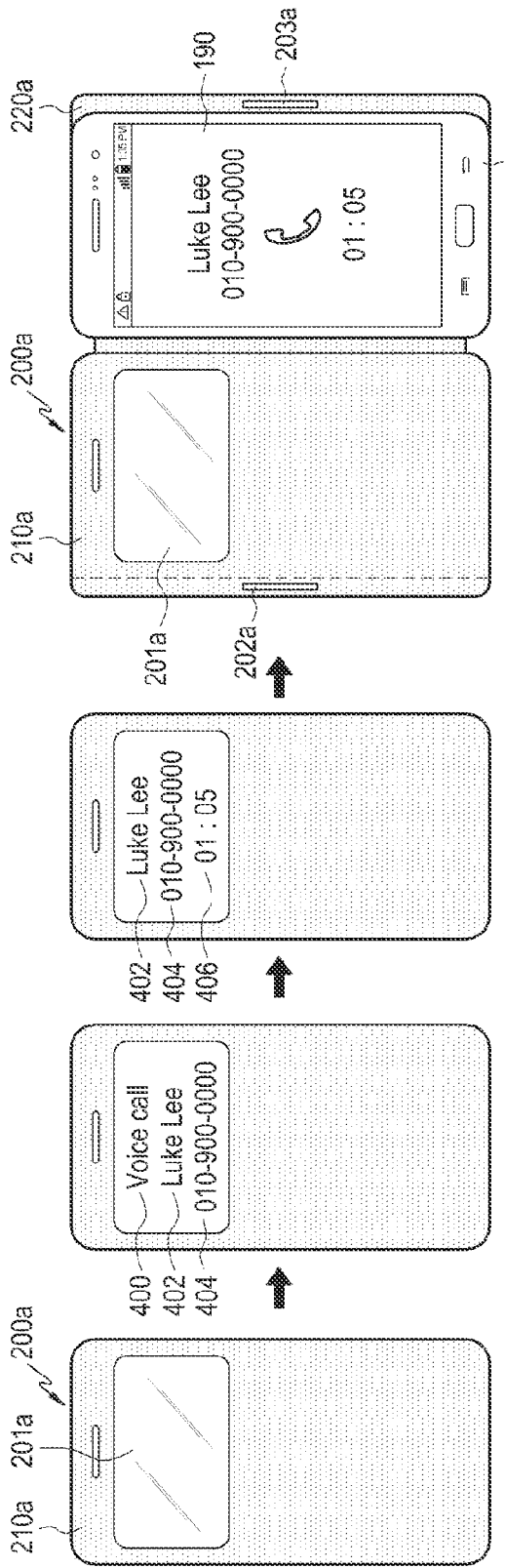
FIGS. 15A, 15B, 15C, 15D, and 15E illustrate a mobile device that displays a screen depending on a type of a cover with a screen projection portion according to a third embodiment of the present disclosure.

For example, as illustrated in FIG. 15B, upon detecting a trigger corresponding to call reception at operation S 120, the controller 110 may display a screen corresponding to the current state of the mobile device 100 on the touch screen 190 depending on the type of the cover. When displaying a screen corresponding to the current state of the mobile device 100 on the touch screen 190 depending on the type of the cover, the controller 110 may display the screen on the touch screen 190 so as to expose the screen depending on the position of the screen projection portion of the cover. Because the controller 110 determined, at operation S110, that the type of the cover corresponds to a cover in which the position of the screen projection portion 201a corresponds to an upper portion of the front cover portion 210a and the size of the screen projection portion 201 a corresponds to ⅓ of the front cover portion 210a, the controller 110 may display the screen in an upper portion of the front cover portion 210a. For example, the controller 110 may display the screen in an upper portion of the touch screen 190 of the mobile device 100, which corresponds to an upper portion of the front cover portion 210a. If the current state of the mobile device 100 is a call-receiving state, then, as illustrated in FIG. 15B, the controller 110 may display a call-receiving screen 400 including a caller's name 402, a phone number 404, and/or the like on the touch screen 190. Therefore, according to various embodiments of the present disclosure, the controller 110 may display a screen corresponding to the current state of the mobile device 100 on the touch screen 190 depending on the type of the cover.

Upon detecting a trigger input (e.g., an input on a preset button) while the mobile device 100 is in a call-receiving state, the controller 110 may control the mobile device 100 in a call execution state. For example, the preset button may be the Volume button 161e illustrated in FIGS. 2 and 3. Therefore, upon detecting a press on the Volume button 161e, as illustrated in FIG. 15C, the controller 110 may control the mobile device 100 in the call execution state. As illustrated in FIG. 15C, the controller 110 may display a call execution screen including a caller's name 402, a phone number 404, a call time 406, and/or the like in an upper portion of the touch screen 190 of the mobile device 100, which corresponds to an upper portion of the front cover portion 210a.

On the other hand, upon detecting a trigger input (e.g., an input on a preset button) while the mobile device 100 is in a call-receiving state, the controller 110 may control the mobile device 100 in a call rejection state. For example, the preset button may be the Power/Rest button 161d illustrated in FIGS. 2 and 3. Therefore, upon detecting a press on the Power/Rest button 161d, the controller 110 may control the mobile device 100 in the call rejection state as illustrated in FIG. 15D. As illustrated in FIG. 15D, the controller 110 may display a call rejection screen in an upper portion of the touch screen 190 of the mobile device 100, which corresponds to an upper portion of the front cover portion 210a.

At operation S140, the controller 110 may detect an open state of the cover. The cover may include a front cover portion and a rear cover portion, and the controller 110 may detect an open state of the cover by detecting separation between an attached portion of the front cover portion and an attached portion of the rear cover portion. For example, as illustrated in FIG. 15E, the cover 200a may include the front cover portion 210a with the attached portion 202a and the rear cover portion 220a with the attached portion 203a. Therefore, if the cover 200a is opened, a change in electrical signal may occur due to occurrence of separation between the front cover portion 210a and the rear cover portion 220a. The occurred change in electrical signal may be transmitted to the connection terminal 135 illustrated in FIG. 6 of the mobile device 100 through the contact terminal 204a illustrated in FIG. 5 formed on the cover. Therefore, the controller 110 of the mobile device 100 may detect the open state of the cover by recognizing (e.g., detecting) the change in electrical signal, which is received through the connection terminal 135. Alternatively, according to various embodiments of the present disclosure, the controller 110 may detect an open state of the cover using an illuminance sensor or a proximity sensor mounted on the mobile device 100. As another alternative, according to various embodiments o of the present disclosure, the controller 110 may detect an open state of the cover using the folded-state detection sensor 205 illustrated in FIG. 17 formed between the front cover portion and the rear cover portion of the cover.

Upon detecting the open state of the cover at operation S140, the mobile device may proceed to operation S150 at which the controller 110 may display a screen on the touch screen 190 by executing an action corresponding to the current state of the mobile device 100. Specifically, upon detecting the open state of the cover at operation S140, the controller 110 may display a screen on the touch screen 190 by executing an action corresponding to the current state of the mobile device 100. The action corresponding to the current state of the mobile device 100 may be stored in the storage unit 175 in advance. For example, if the current state of the mobile device 100 is a call execution state, the action may be an action to display a call execution screen. Referring to FIG. 15E, the current state of the mobile device 100 is a call execution state. Upon detecting the open state of the cover 200a, the controller 110 may execute an action to display a call execution screen, which corresponds to the current state of the mobile device 100. Therefore, as illustrated in FIG. 15E, the controller 110 may display the call execution screen on the touch screen 190. The call execution screen is not the screen illustrated in FIG. 15C and corresponding to the position and size of the screen projection portion, but may correspond to the common call execution screen spanning over the entire area of the touch screen 190.

Figure 16:
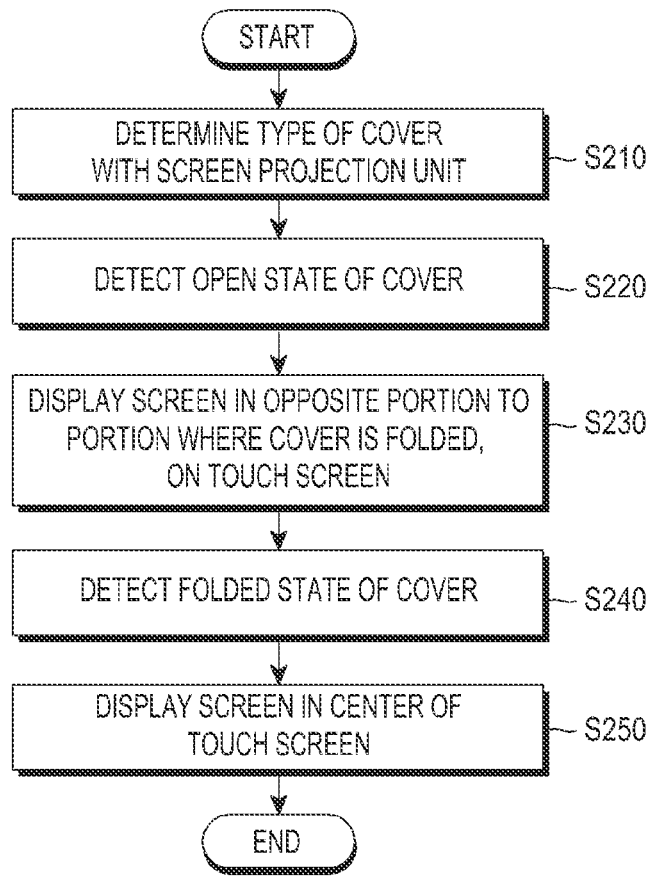
FIG. 16 is a flowchart illustrating a mobile device control method for displaying a screen depending on a type of a cover with a screen projection portion according to an embodiment of the present disclosure.
Figures 18A, 18B, 18C:
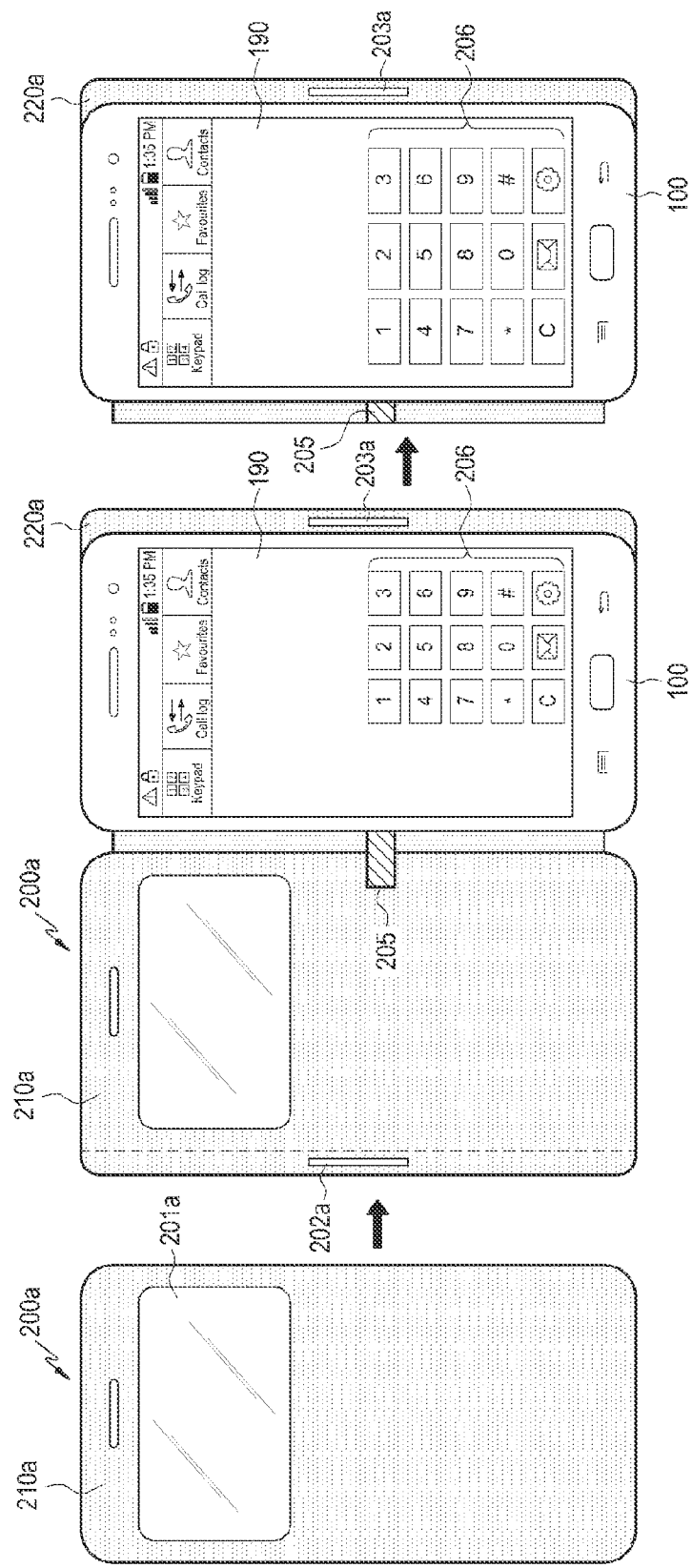
FIGS. 18A, 18B, and 18C illustrate a mobile device that displays a screen depending on a type of a cover with a screen projection portion according to an embodiment of the present disclosure.

FIG. 16 is a flowchart illustrating a mobile device control method for displaying a screen depending on a type of a cover with a screen projection portion according to another embodiment of the present disclosure. FIG. 17 schematically illustrates a cover for covering a mobile device according to an embodiment of the present disclosure. FIGS. 18A, 18B, and 18C illustrate a mobile device that displays a screen depending on a type of a cover with a screen projection portion according to an embodiment of the present disclosure.

Referring to FIG. 16, the mobile device control method for displaying a screen depending on a type of a cover with a screen projection portion according to another embodiment of the present disclosure, at operation S210, the controller 110 may detect a type of a cover with a screen projection portion. Specifically, the controller 110 of the mobile device 100 may determine a type of the cover with a screen projection portion. The controller 110 may determine a type of the cover using a category ID of the cover. The category ID may include information about at least one of a position and a size of the screen projection portion on the cover, and a visual tone of the cover.

The mobile device 100 may include a connection terminal that can be electrically connected to a contact terminal of the cover. On the cover may be formed a contact terminal that can be electrically connected to the mobile device 100. Therefore, the controller 110 of the mobile device 100 may receive data including the category ID through the connection terminal that is electrically connected to the contact terminal of the cover. The controller 110 may determine a type of the cover using the received data including the category ID.

Referring to FIGS. 18A, 18B, and 18C, the mobile device 100 is covered with the cover 200a with the screen projection portion 201a. The cover 200a illustrated in FIGS. 18A, 18B, and 18C may correspond to an example in which the screen projection portion 201a described in relation to FIGS. 4A, 4B and 5 is formed in an upper portion of the front cover portion 210a. The controller 110 may detect a type of the cover 200a using the category ID of the cover 200a. The category ID may include information about at least one of a position and a size of the screen projection portion on the cover, and a vision tone of the cover. Therefore, the cover 200a illustrated in FIGS. 18A, 18B, and 18C may have the category ID including information indicating that the position of the screen projection portion 201a corresponds to an upper portion of the front cover portion 210a and the size of the screen projection portion 201a corresponds to ⅓ of the front cover portion 210a. The controller 110 of the mobile device 100 may receive data including the category ID through the connection terminal 135 illustrated in FIG. 6 that is electrically connected to a contact terminal 204a of the cover 200a. Therefore, the controller 110 may detect a type of the cover 200a using the received data including the category ID. For example, using the category ID, the controller 110 may determine that the type of the cover 200a corresponds to a cover in which the position of the screen projection portion 201a corresponds to an upper portion of the front cover portion 210a and the size of the screen projection portion 201a corresponds to ⅓ of the front cover portion 210a.

At operation S220, the controller 110 may detect an open state of the cover. Specifically, the controller 110 may detect an open state of the cover. The cover may include a front cover portion and a rear cover portion, and the controller 110 may detect an open state of the cover by detecting separation between an attached portion of the front cover portion and an attached portion of the rear cover portion. The attached portion may be formed of a magnet. If the attached portion of the front cover portion is spaced apart from the attached portion of the rear cover portion, a change in electrical signal may occur. The controller 110 of the mobile device 100 may determine that the attached portion of the front cover portion is spaced apart from the attached portion of the rear cover portion, by receiving (e.g., detecting) the change in electrical signal through the contact terminal of the cover and the connection terminal of the mobile device 100.

For example, as illustrated in FIG. 18B, the cover 200a may include the front cover portion 210a with an attached portion 202a and the rear cover portion 220a with an attached portion 203a. Therefore, if the cover 200a is opened, a change in electrical signal may occur due to occurrence of separation between the front cover portion 210a and the rear cover portion 220a. The occurred change in electrical signal may be transmitted to the connection terminal 135 illustrated in FIG. 6) of the mobile device 100 through the contact terminal 204a illustrated in FIG. 17 formed on the cover. Therefore, the controller 110 of the mobile device 100 may detect the open state of the cover by recognizing (e.g., detecting) the change in electrical signal, which is received through the connection terminal 135. Alternatively, according to various embodiments of the present disclosure, the controller 110 may detect an open state of the cover using an illuminance sensor or a proximity sensor mounted on the mobile device 100. As another alternative, according to various embodiments of the present disclosure, the controller 110 may detect an open state of the cover using a folded-state detection sensor 205 illustrated in FIG. 17 formed between the front cover portion and the rear cover portion of the cover.

Upon detecting the open state of the cover at operation S220, the mobile device 100 may proceed to operation S230 at which the controller 110 may display, on the touch screen 190, the screen in an opposite portion to the portion at which the cover is folded. Upon detecting the open state of the cover at operation S220, the controller 110 may display, on the touch screen 190, the screen in the opposite portion to the portion at which the cover is folded. For example, upon detecting the open state of the cover 200a in FIG. 18B, the controller 110 may display, on the touch screen 190, the screen in the opposite portion to the portion at which the cover is folded, as illustrated in FIG. 18B. By displaying, on the touch screen 190, the screen in the opposite portion to the portion at which the cover is folded, as illustrated in FIG. 18B, the mobile device 100 may provide an auto-switch function for a one-hand operation, for the user. Generally, if the portion at which the cover is folded exists in the left side of the mobile device 100 as illustrated in FIG. 18B, the user may open the front cover portion 210a of the cover 200a with the left hand and hold the cover 200a and the mobile device 100 with the right hand. In this case, the user may generally touch the touch screen 190 with the right hand. Therefore, if the controller 110 displays the screen in the opposite portion (e.g., the right side of the mobile device 100 in FIG. 18B) to the portion (e.g., the left side of the mobile device 100 in FIG. 18B) at which the cover is folded, the user may touch the touch screen 190, holding the cover and the mobile device 100 with one hand, so the user may perform a one-hand operation. For example, as illustrated in FIG. 18B, if the controller 110 displays phone number keys 206 for phone calls in the opposite potion (e.g., the right side of the mobile device 100) to the portion (e.g., the left side of the mobile device 100) where the cover is folded, the user may easily touch the phone number keys 206, holding the mobile device 100 with one hand. A function of displaying, on the touch screen 190, the screen in the opposite portion to the portion at which the cover is folded, may be referred to as an auto-switch function. Therefore, according to various embodiments of the present disclosure, the mobile device 100 may provide the auto-switch function for a one-hand operation.

At operation S240, the controller 110 may detect a folded state of the cover. Specifically, the controller 110 may detect a folded state of the cover using the folded-state detection sensor 205 formed between the front cover portion and the rear cover portion of the cover.

FIG. 17 schematically illustrates a cover for covering a mobile device according to an embodiment of the present disclosure.

Referring to FIG. 17, the rear cover portion 220a of the cover 200a may be formed as a battery cover. For example, the rear cover portion 220a may be provided as a component for covering a battery (not shown) mounted on the rear of the mobile device 100. As described above, the cover 200a may include the screen projection portion 201a, and a screen of the mobile device 100 may be exposed through the screen projection portion 201a. The screen projection portion 201a may be provided to allow the user to visually check or view a screen displayed on the touch screen 190, while covering the front of the touch screen 190. For example, the screen projection portion 201a may be formed of a transparent member. As described above, on the cover 200a may be formed the attached portion 202a of the front cover portion 210a and the attached portion 203a of the rear cover portion 220a. In addition, on the cover 200a may be formed a contact terminal 204a that can be electrically connected to the mobile device 100. The mobile device 100 may include a connection terminal that can be electrically connected to the contact terminal 204a. Using the connection terminal, the controller 110 of the mobile device 100 may determine whether the attached portion 202a of the front cover portion 210a of the cover 200a is spaced apart (or separated) from the attached portion 203a of the rear cover portion 220a. The attached portions 202a and 203a may be formed of a magnet. If the attached portion 202a of the front cover portion 210a is spaced apart from the attached portion 203a of the rear cover portion 220a, a change in electrical signal may occur. The controller 110 of the mobile device 100 may determine that the attached portion 202a of the front cover portion 210a is spaced apart from the attached portion 203a of the rear cover portion 220a, by receiving (e.g., detecting) the change in electrical signal through the contact terminal 204a of the cover 200a and the connection terminal of the mobile device 100.

The folded-state detection sensor 205 may be formed between the front cover portion 210a and the rear cover portion 220a of the cover. For example, if the front cover portion 210a is folded on the rear cover portion 220a, the folded-state detection sensor 205 may be folded together. In this case, a change in electrical signal may occur in the folded-state detection sensor 205. The occurred change in electrical signal may be transmitted to the mobile device 100 through the contact terminal 204a formed on the cover 200a. For example, the controller 110 of the mobile device 100 may receive the change in electrical signal through the connection terminal 135 that is formed in the mobile device 100 and electrically connected to the contact terminal 204a of the cover. Therefore, the controller 110 may detect a folded state of the cover by recognizing (e.g., detecting) the received change in electrical signal.

Upon detecting the folded state of the cover, the mobile device may proceed to operation S250 at which the controller 110 may display the screen in the center of the touch screen 190. Specifically, upon detecting the folded state of the cover at operation S240, the controller 110 may display the screen in the center of the touch screen 190. For example, upon detecting the folded state of the cover, the controller 110 may display the screen in the center of the touch screen 190 by recovering the screen that was displayed in the opposite portion to the portion at which the cover was folded, on the touch screen 190 at operation S230. Then, the user may perform an operation, watching the normal screen that is displayed in the center of the touch screen 190.

It can be appreciated that various embodiments of the present disclosure may be implemented by hardware, software or a combination thereof The software may be stored in volatile or non-volatile storage (e.g., erasable/rewritable ROM), memory (e.g., RAM, memory chip, memory device or memory Integrated Circuit (IC)), or optically/magnetically recordable non-transitory machine-readable (e.g., non-transitory computer-readable) storage media (e.g., Compact Disk (CD), Digital Versatile Disk (DVD), magnetic disk, or magnetic tape). Various embodiments of the present disclosure may be implemented by a computer or a mobile terminal including a controller and a memory. The memory may be a mere example of non-transitory machine-readable (e.g., non-transitory computer-readable) storage media suitable to store a program or programs including instructions for implementing the various embodiments of the present disclosure. Therefore, various embodiments of the present disclosure may include a program including codes for implementing the apparatus and method as defined by the appended claims, and non-transitory machine-readable (e.g., non-transitory computer-readable) storage media storing the program. The program may be electronically carried by any media such as communication signals which are transmitted through wired or wireless connections.

The mobile device may receive and store the program from a program server to which it is connected by wires or wirelessly. The program server may include a memory for storing a program including instructions for implementing various embodiments of the present disclosure and storing information needed for various embodiments of the present disclosure, a communication unit for performing wired/wireless communications with the mobile device, and a controller for transmitting the program to the mobile device at the request of the mobile device or automatically.

As is apparent from the foregoing description, according to an embodiment of the present disclosure, the mobile device may display information corresponding to its current state on the touch screen depending on the type of the cover.

According to various embodiments of the present disclosure, the mobile device may display a screen on the touch screen so as to expose the screen depending on the position of a screen projection portion of the cover.

According to various embodiment of the present disclosure, upon detecting an open state of the cover, the mobile device may display a screen on the touch screen by executing an action corresponding to its current state.

According to various embodiments of the present disclosure, the mobile device may provide an auto-switch function for a one-hand operation.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for displaying information on a touch screen of a mobile device, the method comprising:
   determining a type of a cover for the mobile device, the cover having a screen projection portion;
   detecting one of a gesture and a trigger; and
   displaying a screen on a touch screen corresponding to a current state of the mobile device depending on the determined type of the cover, in response to the detection of the one of the gesture and the trigger.

2. The method of claim 1, wherein the determining of the type of cover comprises:
   determining the type of the cover using a category Identifier (ID) of the cover,
   wherein the category ID includes information about at least one of a position and a size of the screen projection portion on the cover, and a visual tone of the cover.

3. The method of claim 1, wherein the displaying of the screen on the touch screen corresponding to the current state of the mobile device comprises:
   displaying the screen on the touch screen depending on a position of the screen projection portion of the cover based on the determined type of the cover.

4. The method of claim 1, wherein, if the current state of the mobile device is a locked state, the displayed screen includes information about at least one of time, notifications, and battery status.

5. The method of claim 1, further comprising:
upon detecting an open state of the cover, displaying a screen on the touch screen by executing an action corresponding to the current state of the mobile device.

6. The method of claim 5, wherein the action includes an unlock action.

7. The method of claim 5, wherein the open state of the cover is detected based on one of a separation between an attached portion of a front cover portion of the cover and an attached portion of a rear cover portion of the cover, and a separation between the attached portion of the front cover portion of the cover and an attached portion formed in the mobile device.

8. The method of claim 5, wherein the open state of the cover is detected using at least one of an illuminance sensor and a proximity sensor mounted in the mobile device.

9. The method of claim 1, further comprising:
detecting an open state of the cover;
displaying the screen in an opposite portion to a portion at which the cover is folded, on the touch screen in response to the open state of the cover being detected;
detecting a folded state of the cover; and
displaying the screen in a center of the touch screen in response to the folded state of the cover being detected.

10. The method of claim 9, wherein the folded state of the cover is detected using a folded-state detection sensor formed between a front cover portion of the cover and a rear cover portion of the cover.

11. A mobile device comprising:
a touch screen configured to display information of the mobile device; and
a controller configured to:
determine a type of a cover of the mobile device, the cover having a screen projection portion,
detect one of a gesture and a trigger, and
display a screen on the touch screen corresponding to a current state of the mobile device screen depending on the determined type of the cover, in response to the detection of the one of the gesture and the trigger.

12. The mobile device of claim 11, wherein the controller is further configured to determine the type of the cover using a category Identifier (ID) of the cover, and
wherein the category ID includes information about at least one of a position and a size of the screen projection portion on the cover, and a visual tone of the cover.

13. The mobile device of claim 11, wherein the controller is further configured to display the screen on the touch screen depending on a position of the screen projection portion of the cover based on the determined type of the cover.

14. The mobile device of claim 11, wherein if the current state of the mobile device is a locked state, the screen includes information about at least one of time, notifications, and battery status.

15. The mobile device of claim 11, wherein, upon detecting an open state of the cover, the controller is further configured to display a screen on the touch screen by executing an action corresponding to the current state of the mobile device.

16. The mobile device of claim 15, wherein the action includes an unlock action.

17. The mobile device of claim 15, wherein the controller is further configured to detect the open state of the cover based on one of a separation between an attached portion of a front cover portion of the cover and an attached portion of a rear cover portion of the cover, and a separation between the attached portion of the front cover portion of the cover and an attached portion formed in the mobile device.

18. The mobile device of claim 15, wherein the controller is further configured to detect the open state of the cover using at least one of an illuminance sensor and a proximity sensor mounted in the mobile device.

19. The mobile device of claim 11,
wherein, upon detecting an open state of the cover, the controller is configured to display the screen in an opposite portion to a portion at which the cover is folded, on the touch screen in response to the open state of the cover; and
wherein, upon detecting a folded state of the cover, the controller is configured to display the screen in a center of the touch screen.

20. The mobile device of claim 19, wherein the controller is further configured to detect the folded state of the cover using a folded-state detection sensor formed between a front cover portion of the cover and a rear cover portion of the cover.

21. The mobile device of claim 11, wherein the controller is further configured to display a screen corresponding to a state of the mobile device on the touch screen in response to a detection of a signal generated based on a separation between an attached portion of the cover and the mobile device.

22. The mobile device of claim 21, wherein, if the mobile device is in a locked state, the controller is further configured to release the locked state in response to the detection of the signal.

23. The mobile device of claim 21, wherein the controller is further configured to configure a screen displayed on each of the screen projection portion and the touch screen in response to a detection of a separation between the attached portion of the cover and the mobile device.

24. The mobile device of claim 11, wherein, if a call is received while there is no separation between an attached portion of the cover and the mobile device, the controller is further configured to control the touch screen to display, on an area of the touchscreen corresponding to the screen projection portion of the cover, a screen including at least one of a caller's name and a phone number for the received call.

25. The mobile device of claim 24, wherein the controller is further configured to control the mobile device in a call rejection state, upon detecting an input of a trigger for rejecting the call while the call is received.

26. A method for displaying information, the method comprising:
detecting a signal corresponding to a separation between a mobile device and an attached portion of a cover for the mobile device; and
displaying a screen corresponding to a state of the mobile device in response to the detected signal,
wherein the cover includes a screen projection portion through which the screen displayed on a touch screen of the mobile device is exposed.

27. The method of claim 26, further comprising:
if the mobile device is in a locked state, releasing the locked state in response to the detection of the signal.

28. The method of claim 26, wherein the signal is detected based on a separation between the attached portion of the cover and an attached portion formed in the mobile device.

29. The method of claim 28, wherein the attached portion formed in the mobile device is formed on a rear of a touch screen of the mobile device, or in a bezel part of the mobile device.

30. The method of claim 26,
wherein the screen projection portion is formed in various different positions of the cover.

31. The method of claim 26,
wherein, if the signal is not detected, information about at least one of time, notifications, and battery status is displayed through the screen projection portion in response to the detection of one of the gesture and the trigger.

32. A non-transitory computer readable storage medium storing instructions that, when executed, cause at least one processor to perform the method of claim 1.

33. A non-transitory computer readable storage medium storing instructions that, when executed, cause at least one processor to perform the method of claim 26.

* * * * *